April 1, 1941.  H. E. HERSHEY  2,236,822
SIGNALING SYSTEM
Filed Nov. 21, 1936  11 Sheets-Sheet 2

FIG. 2

INVENTOR.
H. E. HERSHEY
BY Chas. W. Candy
ATTORNEY.

April 1, 1941.  H. E. HERSHEY  2,236,822
SIGNALING SYSTEM
Filed Nov. 21, 1936   11 Sheets-Sheet 3
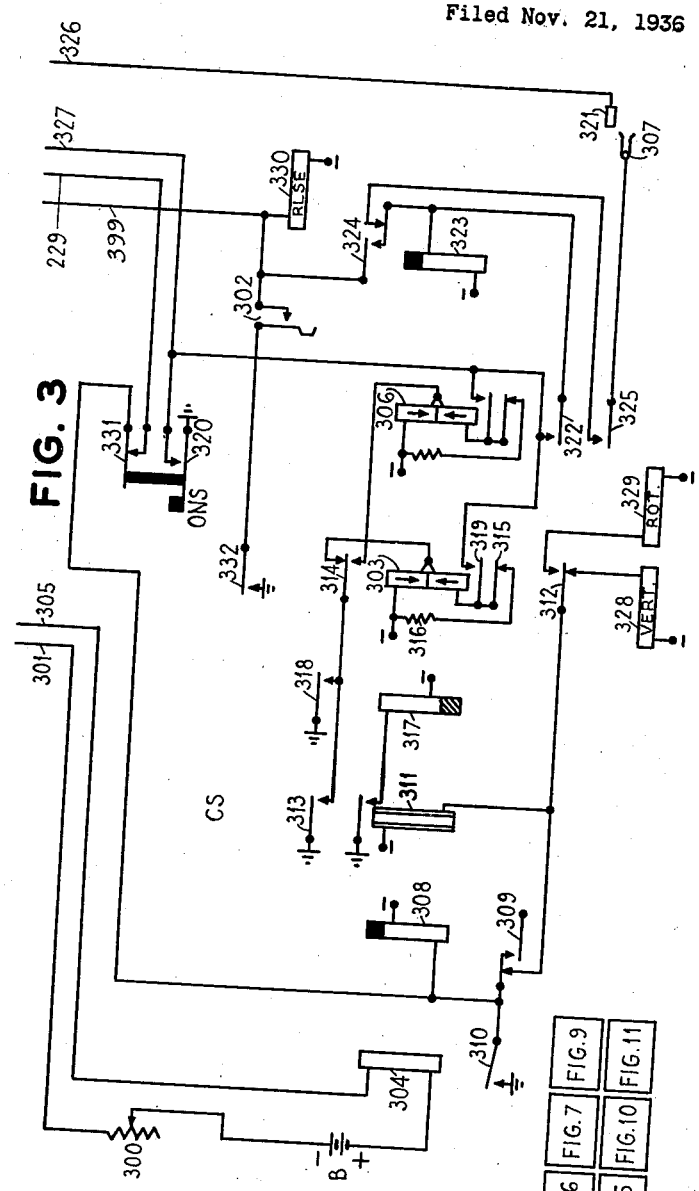
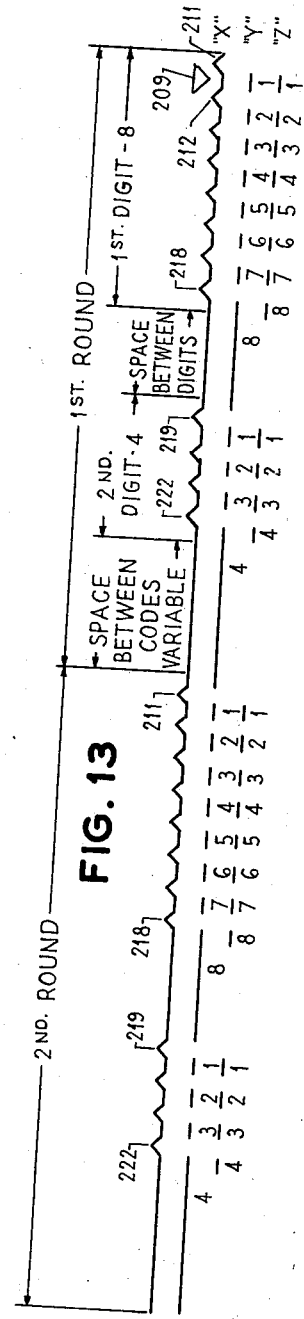
INVENTOR.
H. E. HERSHEY
BY
ATTORNEY.

April 1, 1941.    H. E. HERSHEY    2,236,822
SIGNALING SYSTEM
Filed Nov. 21, 1936    11 Sheets-Sheet 4

INVENTOR.
H. E. HERSHEY
BY Chas. Tu. Candy
ATTORNEY.

April 1, 1941.　　H. E. HERSHEY　　2,236,822
SIGNALING SYSTEM
Filed Nov. 21, 1936　　11 Sheets-Sheet 5

INVENTOR.
H. E. HERSHEY
BY
ATTORNEY.

April 1, 1941.    H. E. HERSHEY    2,236,822
SIGNALING SYSTEM
Filed Nov. 21, 1936    11 Sheets-Sheet 10

INVENTOR.
H. E. HERSHEY
BY
ATTORNEY.

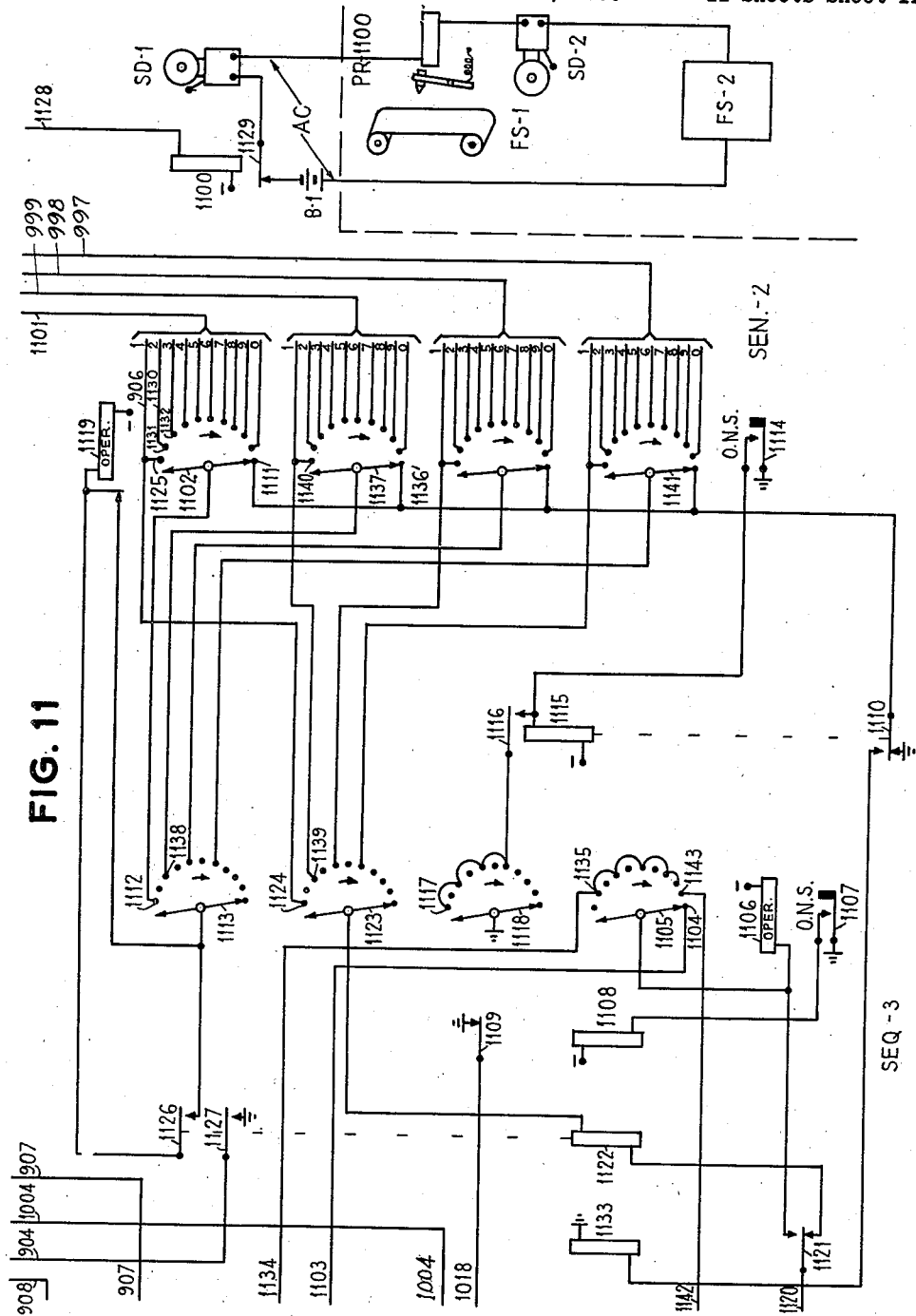

Patented Apr. 1, 1941

2,236,822

UNITED STATES PATENT OFFICE 2,236,822

SIGNALING SYSTEM

Harry E. Hershey, Chicago, Ill., assignor to Associated Electric Laboratories, Inc., Chicago, Ill., a corporation of Delaware Application November 21, 1936, Serial No. 112,032

7 Claims. (Cl. 177—360)

This invention relates to signaling systems in general, but more particularly to improvements in fire alarm systems, and the broad object of the invention, generally stated, is to design a system utilizing fire alarm boxes of both the radial type (which requires a pair of wires individual to each box), and the well known series type, thereby combining the operating advantages of the former with the economies incident to the latter.

A feature of the invention relates to the provision of means in a fire alarm system whereby an alarm from an operated fire alarm box, after being received in the associated district office, is first automatically retransmitted over a high speed trunk to fire alarm headquarters and displayed on a visible display panel, after which as a matter of verification, the box number is re-sent from the district office to fire alarm headquarters over a second trunk which actuates a conventional punch register.

A further feature of the invention relates to means whereby an attendant at the fire alarm headquarters may normally transmit an alarm to each fire station over an alarm circuit, the box numbers being received therein on a conventional punch register and sounding device.

These and other objects and features, not specifically pointed out, will be apparent by referring to the accompanying drawings which, together with the detailed description, constitute the preferred embodiment of the invention.

The invention is illustrated in eleven sheets of drawings, comprising Figs. 1 to 13, Figs. 2, 3, 4, 5, 6, and 8 when laid end to end as indicated in Fig. 12, with their adjoining lines in alignment diagrammatically illustrate the apparatus and circuits of one distant office. In like manner Figs. 7, 9, 10, and 11, when laid out as indicated in Fig. 12, indicate the apparatus and circuits at fire alarm headquarters.

Fig. 1 diagrammatically shows the general layout of the complete system as shown in detail on the other drawings.

In the center of the drawing as indicated the equipment at fire alarm headquarters, which, among other things comprises the manually operated transmitter TR by means of which an attendant may transmit alarms over the alarm circuit AC to the fire stations, such as that indicated at FS.

The system is preferably made up of several district offices, their numbers and relative location being determined by the outside wire plant, the two indicated in the drawing representing a typical illustration.

Each district office, for example No. 1, has a plurality of fire alarm boxes connected to it, the preferred number again being determined by the outside wire plant for that particular district. Certain of these boxes, presumably those adjacent to the center of the outside wire plant, will each be connected to the district office by an individual pair of wires, such a "radial box" circuit is indicated at R. B. C.

It is readily apparent that the wire cost of such a procedure would become prohibitive in the case of boxes located in an outlying sparsely settled section, therefore provision has been made to incorporate within the district any required number of "series box" circuits, such a series box circuit being indicated at SBC.

Each district office is connected with fire alarm headquaters by both a retransmission trunk and a verification trunk. The high speed retransmission trunk terminates on a visual display panel, such as DP—1. Provision is here made for displaying a four-digit box number. A subsequent operation over the verification trunk then causes a conventional punch register, as indicated by PR—1, to permanently record the same four-digit box number.

Fig. 2 shows a single radial box RB—1 connected by an individual pair of wires RBC to the six-conductor test jack RTJ located within a district office. In association therewith is shown the fire alarm lamp FAL—1 and the trouble lamp TAL—1.

At the bottom of the figure is shown a single series box circuit SBC, within which may be inserted a plurality of series boxes such as the one shown at SB—1. The series box circuit terminates within a district office on the six-conductor test jack STJ. In association therewith is shown the fire alarm lamp FAL—2 and the trouble alarm lamp TAL—2.

The series box shown diagrammatically at SB—1 may be of the well known non-interfering and succession type, but is preferably of the type which, while normally conditioned for metallic circuit operation, has provisions for operation through a normally open ground return circuit in the event of a broken metallic circuit. A box of the latter general type is disclosed in Patent No. 1,664,952, issued April 3, 1928, to Nathan H. Suren.

Fig. 3 shows a connector switch CS which is individual to the series box circuit SBC shown in Fig. 2. As to mechanical structure this connector switch is of the well known type of Strowger vertical and rotary step-by-step switch, the circuit arrangement, however, is such that the connector will respond to two-digit codes transmitted by the series fire alarm box SB—1 shown in Fig. 2.

At the bottom of the figure is shown a group of series box relays SBR; one such relay group will be provided for each series box, such as SB—1 shown in Fig. 2. A particular series box relay group will be selectively seized by the connector of Fig. 3 in response to the two-digit code resulting from the operation of the associated series box. It is to be understood that there may be a plurality of series box circuits, such as SBC of Fig. 2, working out of the district office; and that each will have associated therewith an individual connector switch, such as CS, Fig. 3; and in further association will be one group of series box relays, such as SBR of Fig. 4, for each series box on the circuit.

Figure 4:
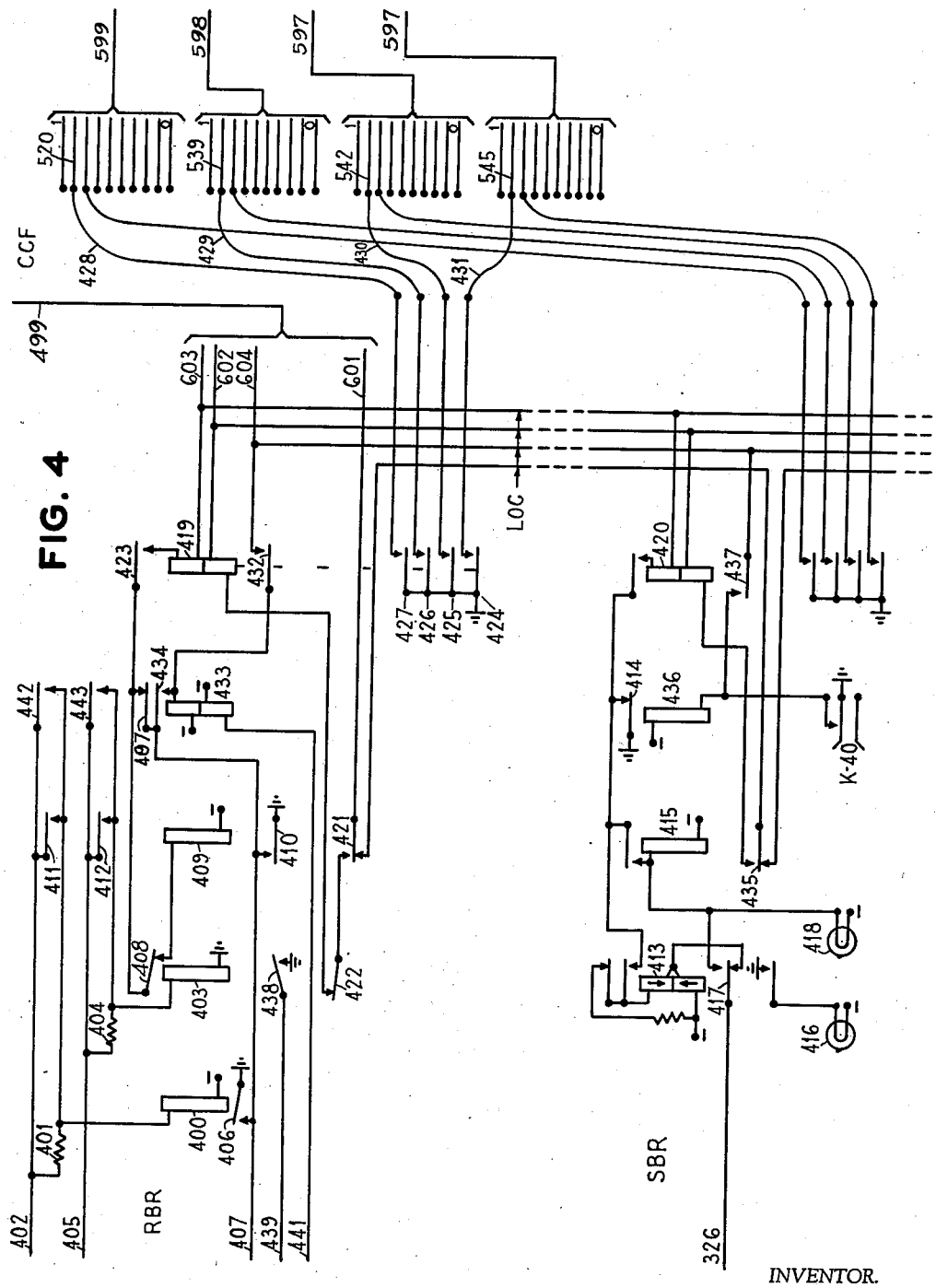
Fig. 4 shows a group of radial box relays RBR which are individual to the radial box RB—1 of Fig. 2. A plurality of such relay groups will be present within the district office.

Only one relay group of each class has been shown in Fig. 4, but it is to be understood that the four-conductor lockout circuit LOC will in practice extend through all box relay groups within the district office. The lockout circuit provides means whereby, in the event of simultaneous operation of two or more relay groups, only a single one will gain access to the retransmitting equipment.

At the right of the figure is shown a cross-connecting frame CCF, whereby the contacts of a marker relay, such as relay 419 of RBR, may be associated with the retransmitting equipment in such a way as to cause the transmission of the four-digit number distinctive of the box associated therewith. To avoid confusion, it may be stated at this time that each series box (as well as each radial box) is designated by a four-digit number, notwithstanding the fact that the code wheel therein is designated to transmit only a two-digit number.

Figure 5:
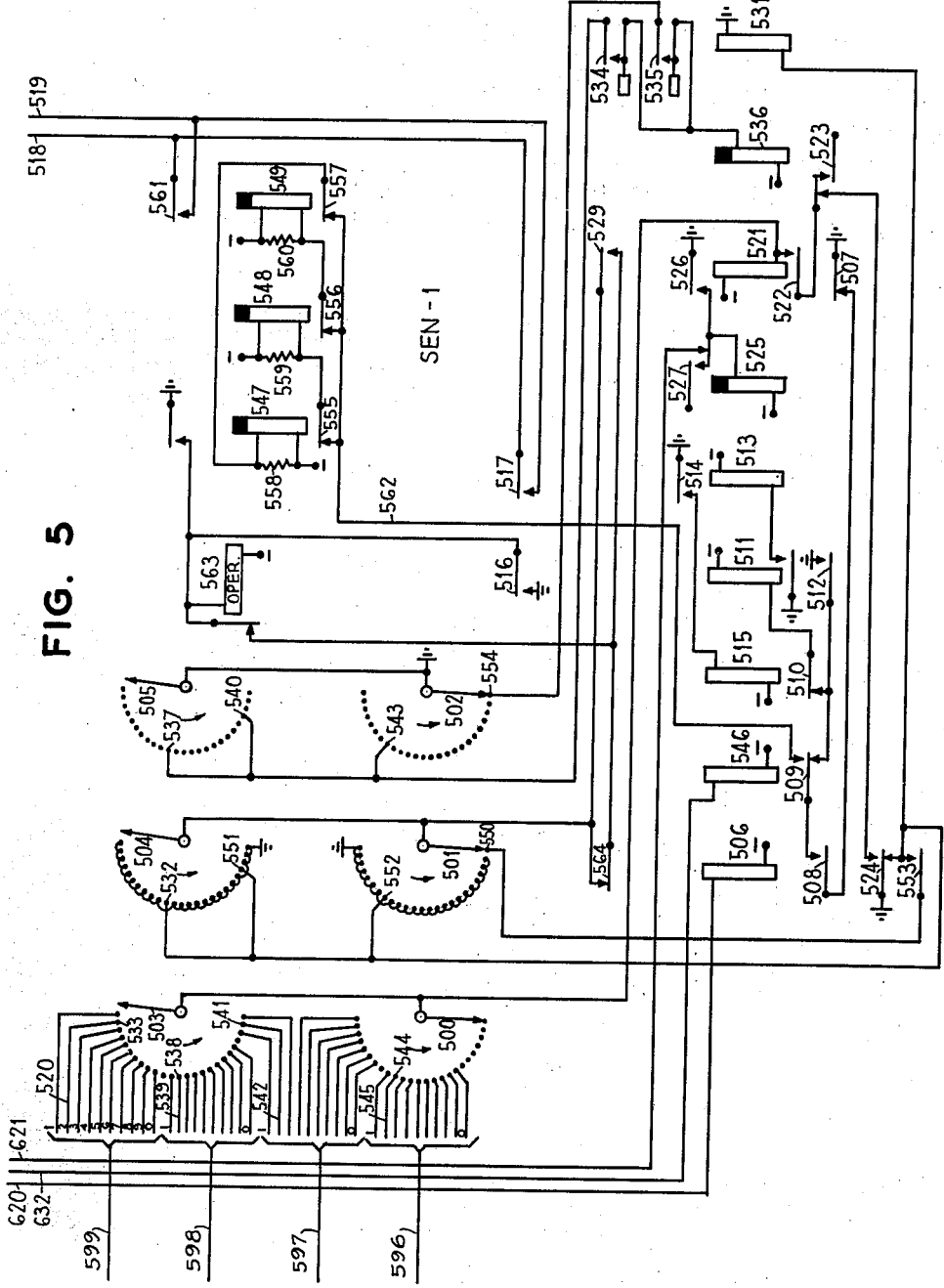

Fig. 5 shows a sender switch SEN—1 which forms a part of the retransmitting equipment and translates the marking established by a group of box relays into a four-digit code indicative of the box number associated therewith.

Provision is made such that the sender may operate at two speeds, which, for convenience, will be referred to as high speed and low speed.

Figure 6:
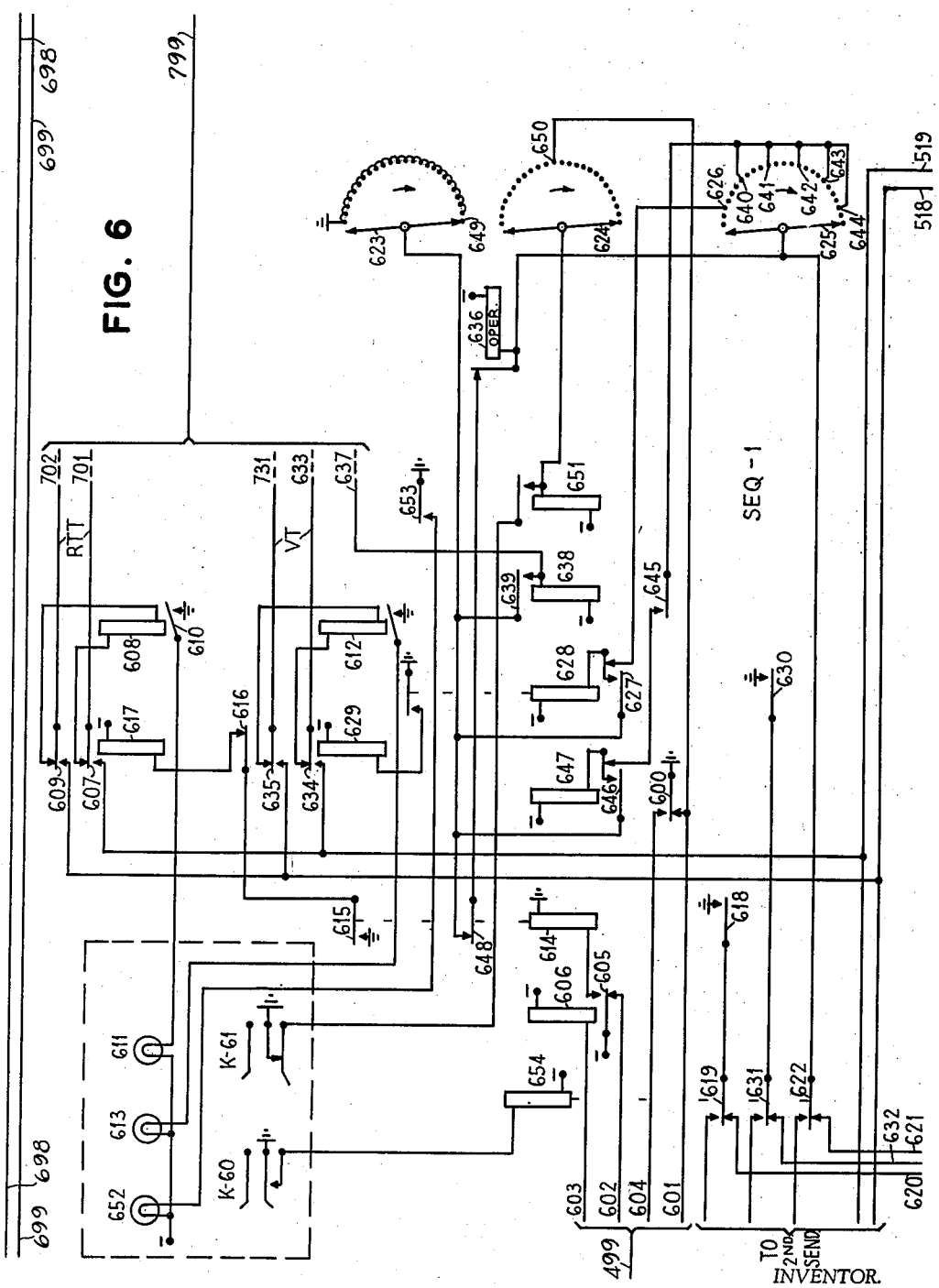

Fig. 6 shows a sequence switch SEQ—1 which is also a part of the retransmitting equipment. Relays associated therewith control the lockout circuit LOC of Fig. 4; but its principal function is to so control the sender switch SEN—1 of Fig. 5 that a four-digit box code may be retransmitted once only, at high speed, over the retransmission trunk RTT, after which it will be retransmitted at low speed over the verification trunk VT.

The equipment so far discussed in detail, that shown in Figs. 2, 3, 4, 5 and 6, has all been located within the district office, or associated therewith, as were the box circuits of Fig. 2. We will now consider the equipment at fire alarm headquarters, first with reference to the termination of the retransmission trunk RTT and the verification trunk VT shown in Fig. 6.

Figure 1:
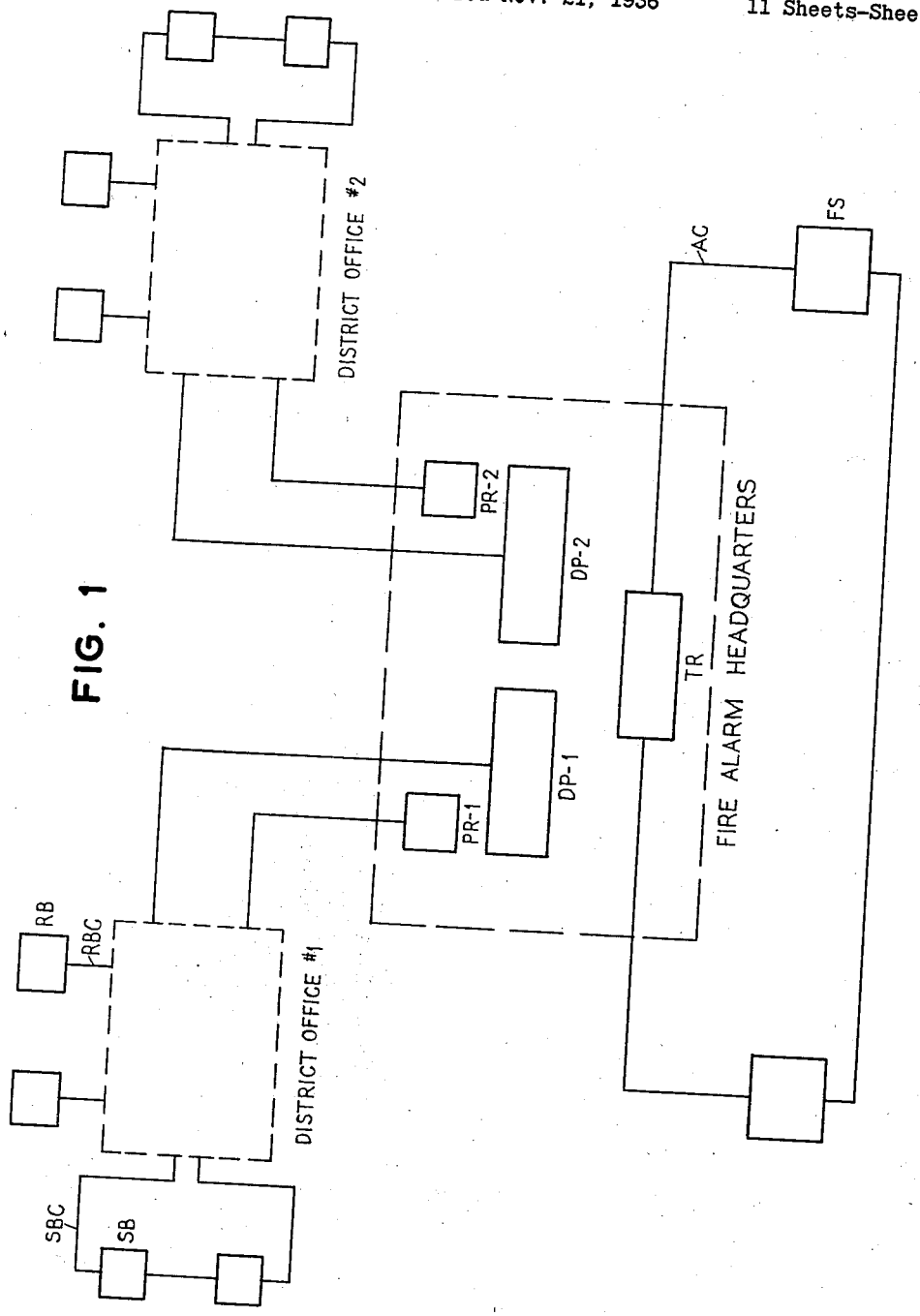
Figure 7:
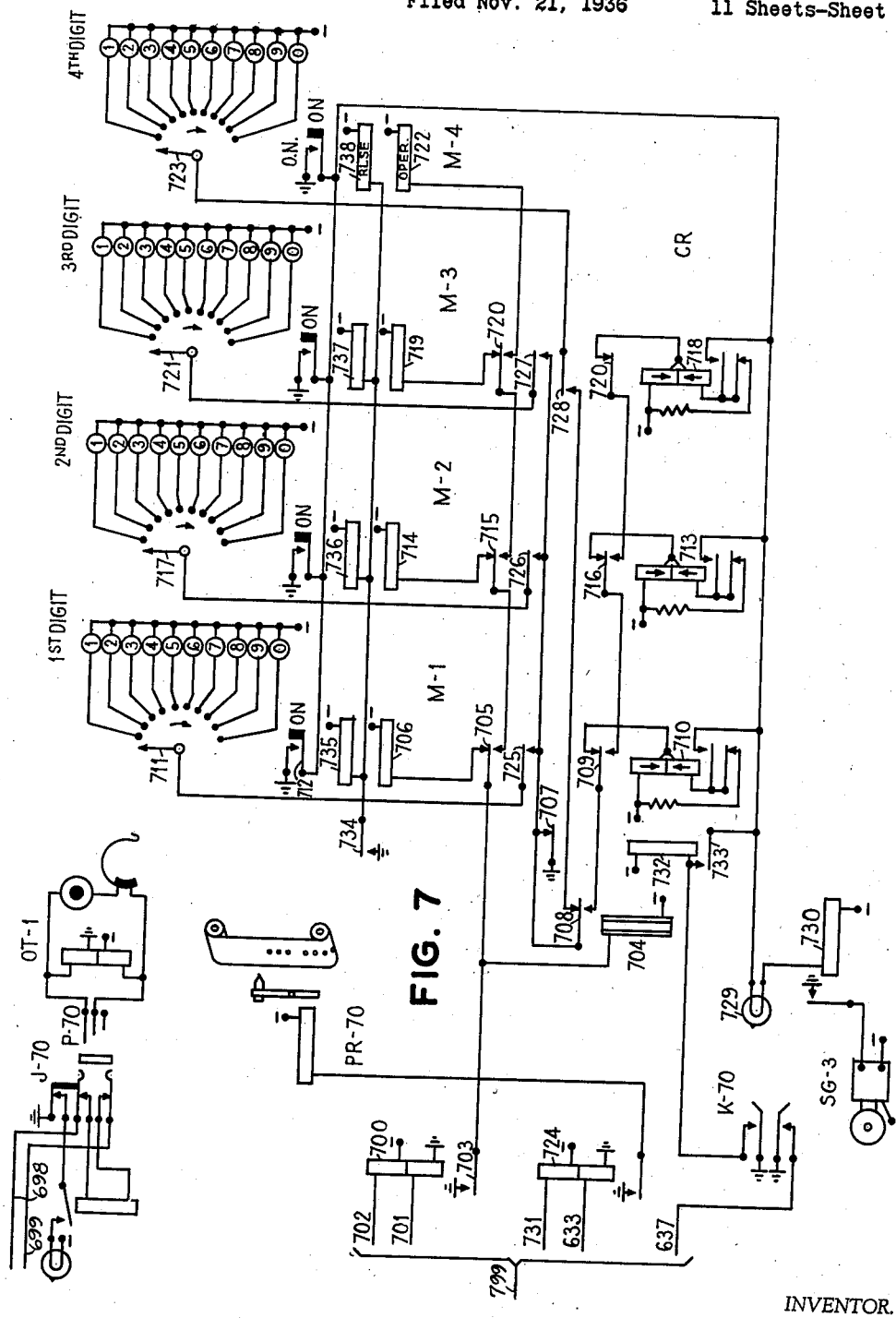

Fig. 7 shows a four-digit code register which comprises the minor switches M—1, M—2, M—3, and M—4, which are responsive in the order named. The single level of back contacts associated with each minor switch are connected up to a bank of ten lamps. The forty lamps thus provided comprise a display panel, as indicated by DP—1 of Fig. 1, upon which may be set up a four-digit box number. The code register CR is under the control of line relay 700, which is the terminus of the retransmission trunk RTT in Fig. 6.

At the left of the figure is shown the punch register PR—70 which is controlled by relay 724, the latter being the terminus of the verification trunk VT shown in Fig. 6.

At the upper left of the figure is shown the three-conductor jack J—70 which is the fire alarm headquarters terminus of a two-way telephone trunk extending to the district office. Access thereto may be had by means of the operator telephone circuit OT—1.

We will now return to a consideration of the district office, and particularly the means by which telephone communication may be established between a box circuit therein and fire alarm headquarters.

Figure 8:
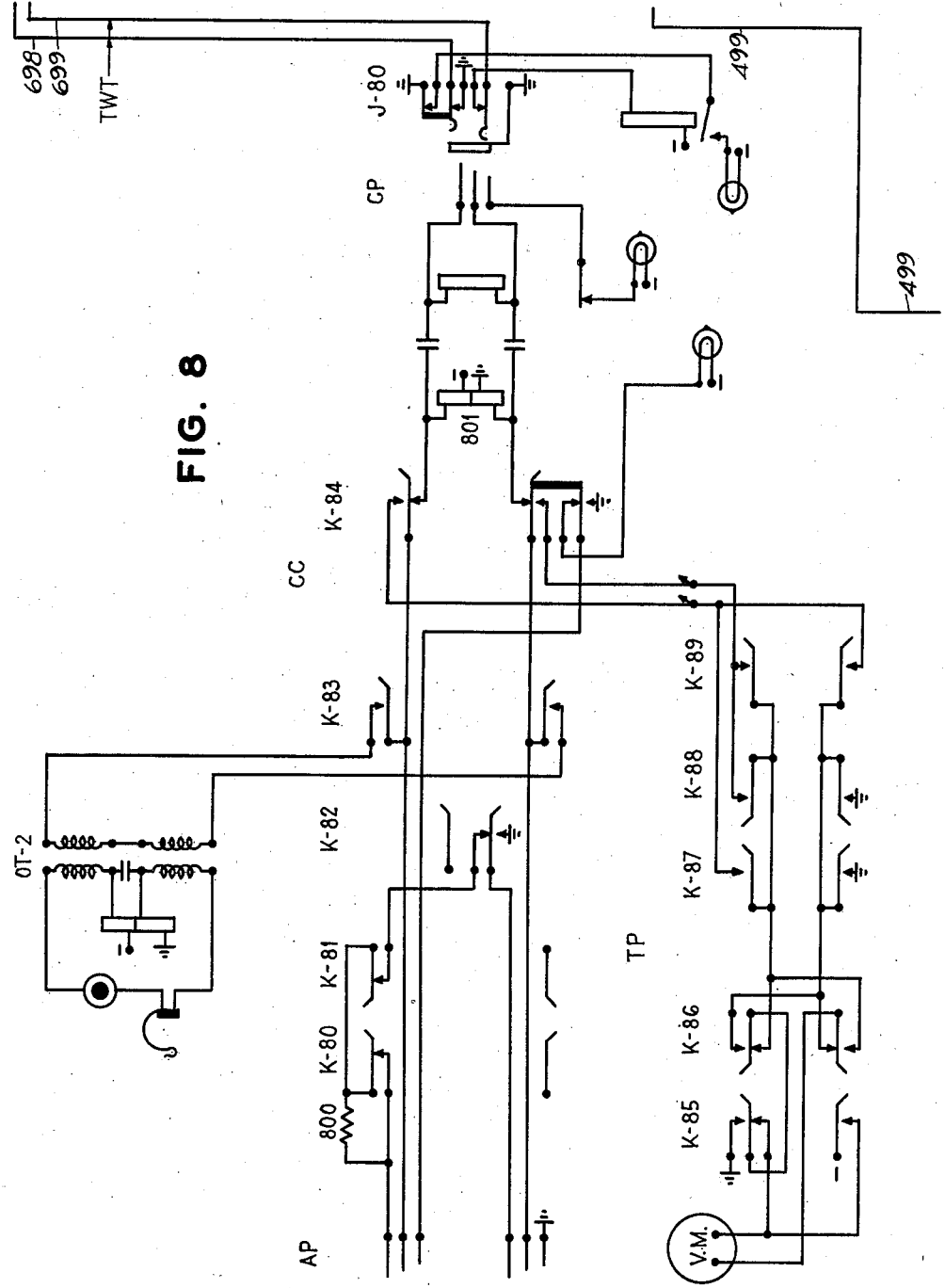

Fig. 8 shows a telephone cord circuit so arranged that the six-conductor answering plug AP may be inserted into any test jack within the district office, such as RTJ or STJ of Fig. 2, while the three-conductor calling plug CP gives access, by way of jack J—80, to the two-way trunk TWT which extends to fire alarm headquarters and is terminated upon jack J—70 of Fig. 7.

The discussion up to this point has covered the initiation of a fire alarm, either by way of a radial or a series box circuit, and the retransmission of the corresponding box numbers to the fire alarm headquarters.

We will now consider the alarm circuit which extends from fire alarm headquarters to the various fire stations, with particular reference to the manually operated transmitter utilized to produce coded signals which are received in each fire station on a conventional punch register and bell.

Figure 9:
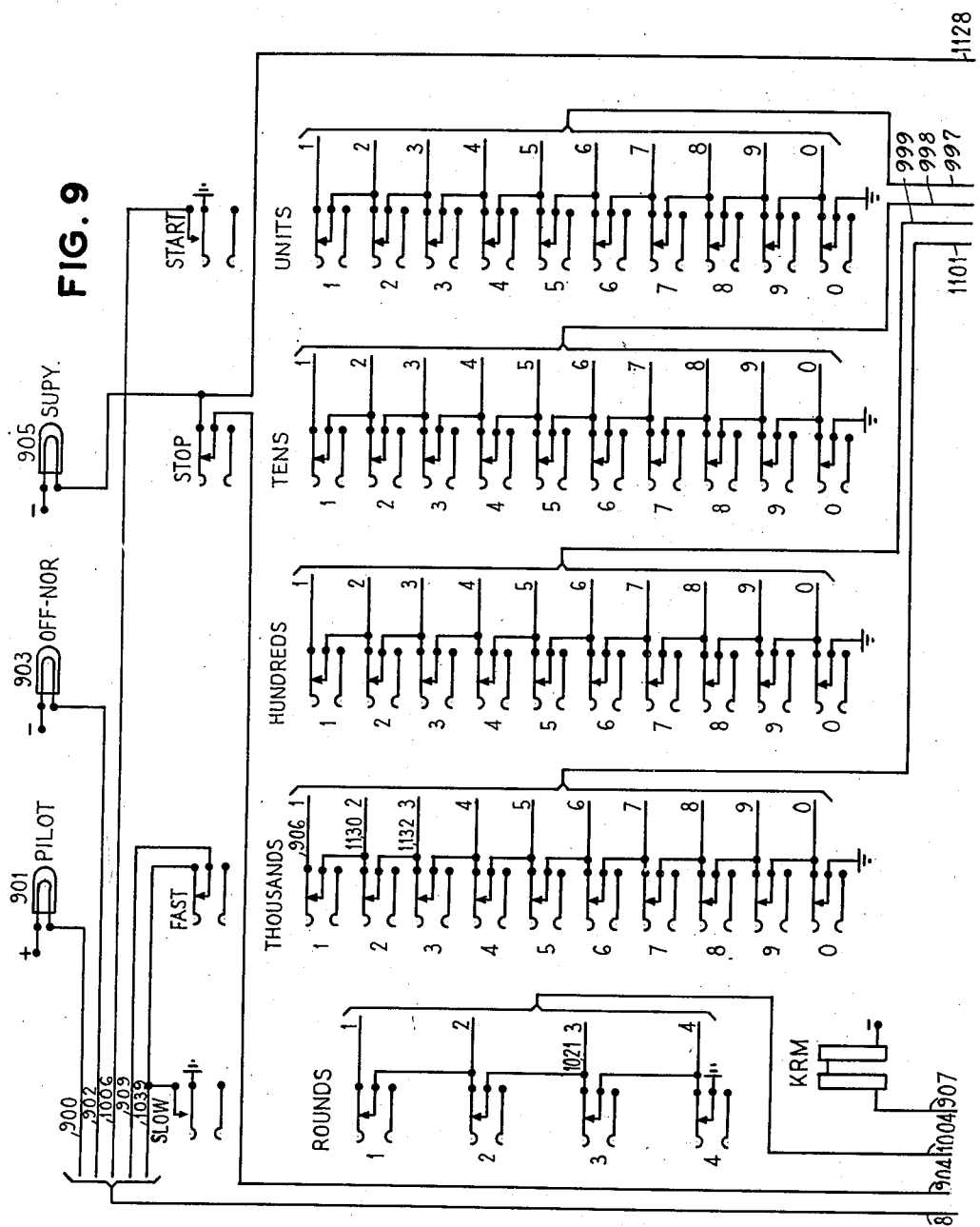

Fig. 9 shows the keyboard of a normally operated transmitter designed to send a four-digit box number either one, two, three, or four times. At the left of the figure is shown a vertical row of four keys, under the designation Rounds, the depression of one of these keys will establish the number of repetitions of the code next to be sent by the transmitter. Four other vertical rows of ten keys each are indicated, the first is designated Thousands, the second Hundreds, the third Tens, and the fourth Units. The depression of one key in each row will establish the four-digit box number next to be sent by the transmitter.

All of the aforementioned keys are of the locking type and will remain depressed when once operated, thus affording a visual indication of the number of rounds and the box code next to be sent. The keys are also interlocking within each vertical row, i. e., the depression of any key in a given row will result in the release of the key last operated within that row. The interlocking feature common to each row is also under the control of the release magnet KRM, which when energized, functions to restore all keys to normal.

Figure 10:
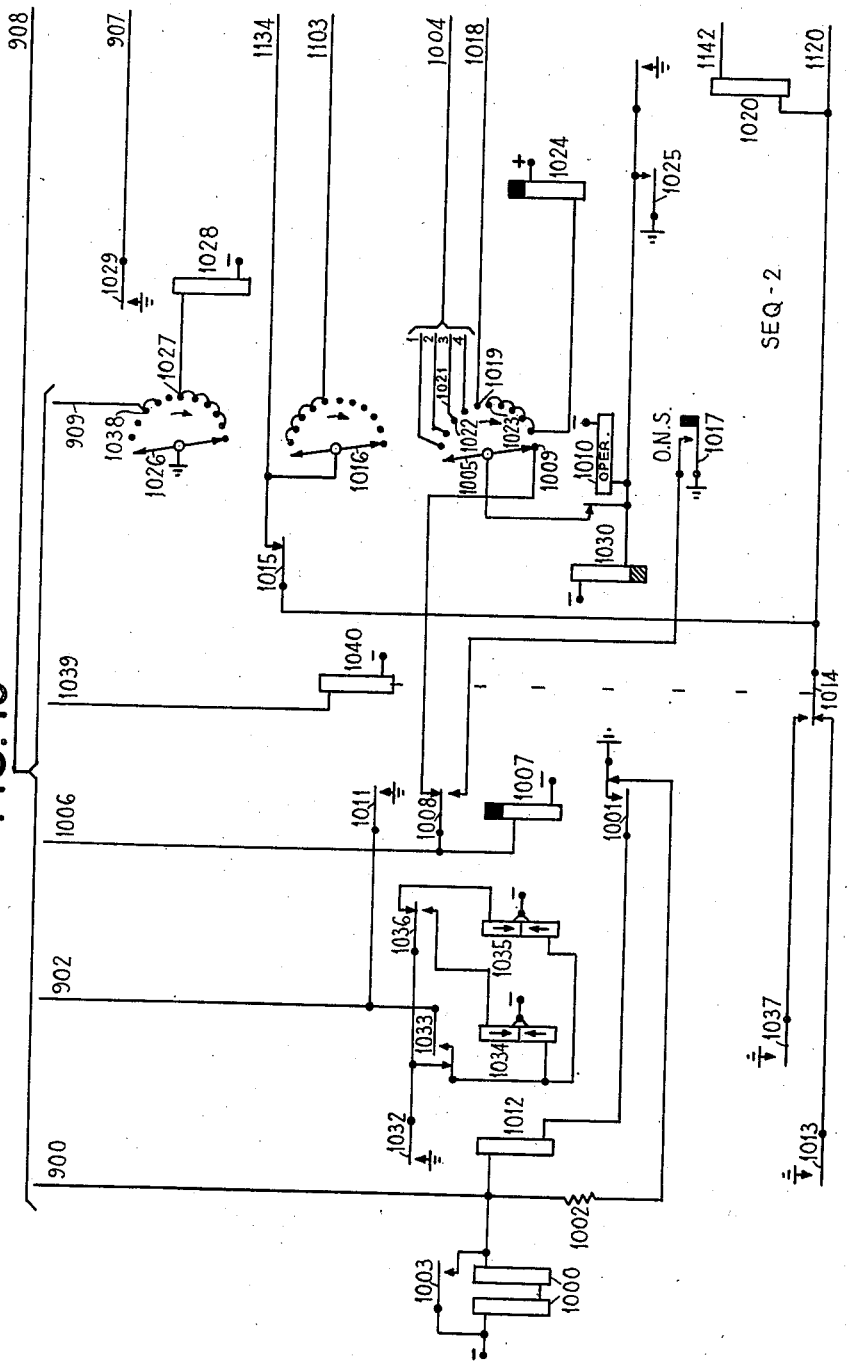

Fig. 10 shows the sequence switch SEQ—2 which functions to control the number of repeats established by the operated Rounds key of Fig. 9.

Fig. 11 shows the sequence switch SEQ—3 which functions to connect the sender SEN—2 with the box number set-up keys of Fig. 9.

Fig. 12 is a key sheet indicative of the relationship of the various sheets which comprise the drawings.

Fig. 13 is a development of the periphery of the code wheel which forms a part of the series box SB—1, shown in relation to the operation of the line relay 304 of the connector switch CS, Fig. 3.

The various relays diagrammatically shown throughout the drawings are of the general type ordinarily employed in automatic telephone systems.

The sequence switches SEQ—1, SEQ—2, SEQ—3, and the sender switches SEN—1 and SEN—2 are of the well known single motion pawl and ratchet type arranged to advance their wipers upon each deenergization of their operating magnet.

The minor switches M—1, M—2, M—3, and M—4 are also of the well known single motion pawl and ratchet type, but differ from the sender and sequence switches in that they always advance their wipers upon the energization of their operating magnet, and are provided with release magnets which function, when energized to permit their wipers to restore to a normal position under tension of their restoring springs.

It is believed that a most thorough understanding of the invention can be attained by describing the operation, resulting first, from the "pulling" of a radial fire alarm box; and second, from the "pulling" of a series fire alarm box.

Radial box alarm

The radial fire alarm box RB—1 shown in Fig. 2 may be of any well known type of construction such as the "break glass" type, wherein a handle is pulled to momentarily open the normally closed shunt contact 200. Referring to the group of radial box relays RBR shown in Fig. 4, it will be seen that the negative side of a battery common to all radial lines is fed through relay 400, resistance 401, conductor 402, and by way of the upper break contact of test jack RTJ to conductor 201 of the radial box circuit RBC. The positive side of the same battery is connected to ground, and is also fed through high resistance relay 403, resistance 404, conductor 405, and by way of the lower break contact of test jack RTJ to conductor 202 of the radial box circuit RBC. The foregoing relays are both normally energized through relay 203, which is bridged across line conductors 201 and 202 by way of the lower break contacts of the telephone jack J—20 and the shunt contact 200. The normal current flowing in this circuit is sufficient to energize relays 203, 400, and 403.

We will now assume that radial box RB—1 is pulled, the resulting momentary breaking of shunt contact 200 will insert the resistance 204 in the box circuit, thereby reducing the current flow to the point where relay 400 will deenergize; relay 403, because of its high resistance, will remain energized at this time.

The deenergization of relay 400 closes a circuit from ground at armature 406, and its break contact, conductor 407, through fire alarm lamp FAL—1 and relay 205 to battery. Relay 205 closes the circuit of an audible alarm signal SG—1 indicative of a fire alarm, while the illumination of the lamp FAL—1 indicates the particular radial box that was pulled.

A further result of the deenergization of relay 400 is the closure of a multiple circuit extending from conductor 407, armature 407 and its break contact, armature 408 and its make contact, through relay 409 to battery. Relay 409 will now energize and place ground on conductor 407, by way of armature 410 and its make contact, thus anticipating the eventual reenergization of relay 400. It is further to be noted that the energization of relay 409 caused the shunting of resistances 401 and 404 at armatures 411 and 412, respectively. Hence, when the resistance 204 is again shunted out, following the momentary operation of shunt contact 200, the line current will rise to an abnormal volume, thus insuring the reenergization of relay 400.

The operation of bringing in an alarm from an operated radial box is now complete, the audible signal SG—1 is indicating a fire alarm, the lamp FAL—1 is designating the particular radial box which was operated, and relay 409 of radial box relay group RBR is energized in readiness to seize the retransmitting equipment at the first opportunity.

Before proceeding with a description of the seizure of the retransmission equipment we will digress for a moment and consider an alarm originating at a series box.

Series box alarm, metallic operation

Referring to the connector switch CS of Fig. 3, it will be noted that the negative side of the individual ungrounded battery B is connected by way of the variable resistance 300, conductor 301, break contact controlled by armature 223, to conductor 224 of the series box circuit SBC. The positive side of the battery B is connected by way of relay 304, conductor 305, break contact and armature 230 in shunt with impedance 225, break contact controlled by armature 226, armature 227 and its break contact to conductor 228 of the series box circuit SBC. The current normally flowing in this circuit is sufficient to maintain relay 304 in an energized position.

For the purpose of the present description the series box SB—1 only need be described as providing, among other things, a pair of protective contacts 206 which normally shunt the box; a pair of signaling contacts 207 and 208 which, while normally in engagement, are under the control of the signaling lever 209 in such a manner that they will be actuated in accordance with the code cut into the periphery of the code wheel 210.

As the series boxes here described are to actuate a Strowger connector switch it is essential that the code consists only of two digits. Therefore, the largest possible code will be represented by a code wheel having two groups of ten teeth each. It is desirable that the space between digits should equal that of three teeth, and it follows then that the space between rounds or repetitions will be a variable, and it is a part of this invention to provide circuit means such that a variable of this kind will be acceptable to the Strowger connector switch.

The pulling of series box SB—1, at a time when the circuit is at normal, will cause the protective shunt contact 206 to open, the mechanism to start rotation, and the signaling lever 209 to fall into engagement with the periphery of the code wheel 210, thus opening the line circuit at signaling contacts 207 and 208, with the result that line relay 304 will deenergize. The mechanism of the box is such that the code wheel 210 will make four complete rotations in a clockwise direction, after which it will come to rest with the apparatus again in the normal position shown in the figure. Each tooth on the code wheel will cause the signaling lever 209 to momentarily close the signaling contacts 207 and 208, thereby completing the line circuit and causing the momentary operation of line relay 304.

For the moment it will suffice to state that the Strowger connector switch magnets are energized upon the deenergization of line relay 304 and, as it is desired that the connector respond one step for each tooth cut in the periphery of the code wheel 210, it follows that the said code wheel must be so positioned upon its shaft that, following the pulling of the box, the signaling lever 209 will first fall between teeth 211 and 212.

In order that this relationship may be made more clear reference is had to Fig. 13 wherein is represented at X a development of the periphery of the code wheel 210 which is indicative of two complete rotations or rounds. It will be noted that the signaling lever 209 is so positioned that it will first fall between teeth 211 and 212. The dashes to the left of the reference Y indicate pulses of current delivered by armature 310 of line relay 304, in the event that the box has been pulled, thus causing the development X to move uniformly to the right while in engagement with the signaling lever 209.

It will be seen that the original falling away of the signaling lever 209, together with the operation thereof caused by the passage of teeth 212 to 218, inclusive, will result in eight impulses of current being delivered by armature 310, which represents the first digit of the box code. The passage of teeth 219 to 222, inclusive, under the signaling lever 209 will result in four impulses of current being delivered by armature 310, which represents the second and last digit of the two digit box code. During the second round of the code wheel 210 teeth 211 to 218, inclusive, will pass under the signaling lever 209, and eight pulses of current will again be delivered by armature 310, which represents the first digit of the box code in the second round. The passage of teeth 219 to 222, inclusive, under the signaling lever 209 will again result in four impulses of current being delivered by armature 310, which represents the second and last digit of the two-digit code box in the second round. Rounds three and four will have a similar effect, after which the apparatus will come to rest in the normal position indicated in Figs. 2 and 13.

The Strowger connector switch CS consists of the usual vertical magnet 328, rotary magnet 329, and release magnet 330, together with the off-normal springs ONS which operate on the first vertical step, and the shaft spring assembly 302 which is closed only upon vertical steps 1, 2, 3, 4, and 5. Relay 303 serves to transfer the impulsing circuit of armature 310, after the completion of the first digit of the code, from the vertical magnet 328 to the rotary magnet 329. Relay 306 operates after the completion of the two-digit code and functions to first transmit an impulse of current to the wiper 307, and then to cause the connector to release to normal position. The whole function of the connector switch is to respond to a two-digit box code and thereby actuate a selected series box relay group such as SBR of Fig. 4.

We will now assume that the series box SB—1 has been pulled, and will consider the operation of the connector switch CS in detail. As was shown in Fig. 13, the last impulse of each digit delivered by armature 310 is of excessive length and not well suited to the operation of Strowger switch magnets. A pulse shortener, in the form of slow-to-operate relay 308, has been introduced in order that all pulses to the connector switch magnets may be of one standard length. The relay 308 is preferably timed so that it will operate, with a satisfactory margin of safety, on the normal pulse delivered by armature 310.

At the first deenergization of relay 304 a circuit is closed from ground at the break contact of armature spring 310, through the slow-to-operate relay 308 to negative battery; a circuit parallel thereto is also closed by way of off-normal spring 331 and its break contact, conductor 229, through lamp TAL—2 and relay 299, to negative battery; a parallel circuit is also closed by way of the break contact controlled by armature 309 through slow-to-release relay 311 to negative battery; a parallel circuit is also closed by way of armature 312 and its break contact, through the vertical magnet 328 to negative battery. Slow-to-release relay 311 will now energize and close a circuit from ground at armature 313 and its make contact, armature 314 and its break contact, through the heel winding of relay 303 to negative battery, and in parallel therewith a circuit is closed through the armature winding of relay 303, armature 315 and its break contact, through limiting resistance 316 to negative battery. Relay 303 will not energize at this time because its heel and armature windings are in opposition, the limiting resistance 316 compensating for the higher efficiency of the armature winding. The vertical magnet 328 will energize at this time and raise its shaft and wiper 307 to a position opposite the first level of bank contacts. Slow-to-operate relay 308 will subsequently energize and open the foregoing circuit to relay 311 and the vertical magnet, thus establishing a vertical magnet pulse of desired length. At the next energization of line relay 304 the circuit will be opened to relay 303, whereupon the latter relay will fall away and again prepare the circuit to relay 311 and the vertical magnet.

At each subsequent deenergization of relay 304, brought about by the passage of teeth 212 to 218, inclusive, under the signaling lever 209, a similar pulse of proper length will pass to slow-to-release relay 311 and to the vertical magnet 328. The vertical magnet will respond to these pulses and will raise its shaft and wiper 307 to a position opposite the eighth level of bank contacts. Slow-to-release relay 311 may or may not remain energized during the pulses which represent the first digit of the code. Its operation in this respect is immaterial, for the reason that at its first energization an obvious circuit was closed through slow-to-release relay 317, the latter relay then energized and established a holding circuit for the differential windings of relay 303 at armature spring 318 and its make contact.

As previously pointed out, the dashes to the left of reference Y in Fig. 13 indicate pulses of current delivered by armature 310 of the line relay 304. Attention is now directed to the dashes appearing to the left of the reference Z in the same figure, which indicate pulses of current delivered to the vertical magnet 328 of Fig. 3. It will be readily apparent that the long eighth pulse delivered by armature 310 has been shortened by relay 308 into a pulse of normal length for delivery to the vertical magnet. The end of the first digit is indicated at reference Y only by the unduly long eighth pulse, while at reference Z the end of the first digit is indicated by a space of time during which no pulses are passed to the vertical magnet, it will next be shown that this space causes the operating circuit of the connector to be transferred from the vertical magnet 328 to the rotary magnet 329.

The deenergization of slow-to-release relay 311 will occur some time subsequent to the termination of the last vertical magnet pulse of the group representing the first digit of the code, this will be followed by the deenergization of slow-to-release relay 317 which will open the circuit to the differential windings of relay 303 at armature 318. As previously stated, relay 303 has two balanced windings differentially connected in parallel, one on the heel end of the core and the other on the armature end. The opening of the parallel circuit will cause a collapse of the two magnetic fields, and the difference in die-away time of the fields will permit the last surviving lines of force to act upon armature 319 and cause it to engage its make contact, thereby establishing a circuit from ground at off normal spring 320 and its make contact, make contact and armature 319, through the armature winding of relay 303 in series with the heel winding thereon to negative battery; a circuit parallel thereto is also established from armature 319, armature 315 and its break contact, through limiting resistance 316 to negative battery. The two windings are now energised in a direction to assist each other and as a result relay 303 will become fully operated, thereby preparing the circuit of rotary magnet ROT and the circuit of relay 306. It is evident that the direction of current flow in the heel winding is the same under both circuit arrangements, it follows then that the magnetic field at the heel of the coil dies away most slowly and is responsible for the operation of armature 319.

The operation of the off-normal springs on the first vertical step of the shaft will open the circuit to the trouble alarm lamp TAL—2, and close a circuit from spring 320 and its make contact, conductor 327, through fire alarm lamp FAL—2 and relay 205 to battery. Relay 205 closes the circuit of an audible alarm signal SG—1 indicative of a fire alarm, while the illumination of the lamp FAL—2 indicates the particular series box circuit which is sending in the alarm.

The transmission of the second digit of the code will cause the line relay 304 to deenergize four times, and the pulse shortening relay 308 will function to pass four pulses of current to relay 311 and rotary magnet 329. The rotary magnet will respond thereto and advance the shaft and wiper 307 step by step into engagement with bank contact 84, represented in the figures by reference 321. Relays 311 and 317 will energize at the first rotary pulse and will close the differential circuit of relay 306, which is without effect at this time. The deenergization of relays 311 and 317 will occur some time subsequent to the termination of the last rotary magnet pulse of the group representing the second and last digit of the code, thus removing ground from the differential circuit of relay 306, whereupon the latter relay will become fully operated in a manner similar to that explained in connection with relay 303.

Relay 306, upon energizing, will close a circuit from ground at off-normal spring 320 and its make contact, make contact and armature 322, through slow-to-operate relay 323 to negative battery; a circuit parallel thereto is also closed by way of break contact controlled by armature 324, make contact and armature 325, wiper 307, bank contact 321, conductor 326, and through the differential windings of relay 413 to negative battery. The latter circuit is without effect at this time. Slow-to-operate relay 323 will energize after an appreciable delay, and extend its energizing circuit to the release magnet 330.

The energization of the release magnet causes the shaft and wiper 307 to return to their normal position, its own circuit being opened when the shaft has reached normal by means of the off-normal springs ONS. A further result of the energization of relay 323 is the opening of the differential circuit to relay 413, whereupon the said relay will become fully energized from ground at armature 414. Relay 413 will function to prepare the circuit of relay 415, and close the circuit of the first round lamp 416, thus indicating that a complete code has been received from series box SB—1. Series box SB—1 will now send the second round, or repetition of the code 84, and connector CS will again advance the wiper 307 into engagement with bank contact 321. The wiper circuit will now extend from bank contact 321, conductor 326, armature 417 and its make contact, through relay 415 to negative battery, whereupon the latter relay will energise and lock up to positive battery at armature 414. The second round lamp 418, being in parallel with relay 415, will be illuminated at this time as an indication that the second round, or repetition of the code 84, has been received from series box SB—1.

The series box SB—1 will continue its cycle and send rounds three and four to which the connector CS will respond, but without further effect as relay 415 is already energized. The fact that two rounds have been received of the code representative of series box SB—1 is considered sufficient proof of the operation of that particular box, and therefore a further function of relay 415 is to seize the retransmitting equipment at the first opportunity.

Mention may be made here of a special precaution which has been introduced to guard against the "splitting" of the two-digit code transmitted by a series box. It is evident that, when a code wheel is once in motion, there is nothing to distinguish the sequence of digits transmitted thereby. For the purpose of explanation let us assume that a four-round box has started to send the code 84, and that the first digit is inadvertently lost. In the absence of the above-mentioned precaution the associated connector would respond three times to the code 48, and then come to rest with its shaft and wipers opposite the eighth level of bank contacts. This possibility of error has been eliminated by limiting the number of boxes on a series line by assigning as first digits only the numerals 6, 7, 8, 9, and 0. Shaft springs 302 are closed only upon the vertical steps 1, 2, 3, 4, and 5, as was previously explained, and it follows that the connector switch will refuse to accept any code the first digit of which is either 1, 2, 3, 4, or 5, for, upon the energization of relay 303 following the cessation of any such digit, a circuit will be closed from ground at the make contact of armature 332, shaft springs 302, through release magnet 330 to negative battery. The connector having been arranged to reject vertical pulses of an order less than six, and with the number assignment previously described, it follows that the connector will reject any mutilated two-digit code and will respond only to the digits in their right order.

Seizure of retransmitting equipment

For the purpose of explaining the retransmission equipment we will assume for simultaneous operation of relay 409 of RBR and relay 415 of SBR. A chain circuit, which normally extends through all box relay groups associated with the lockout circuit LOC, may now be traced from ground at armature 600 and its break contact, conductor 601, cable 499, armature 421 and its make contact, armature 422 and its make contact, lower winding of marker relay 419, conductor 602 to negative battery at break contact of armature 605. Relay 419 will now energize and close a holding circuit for its upper winding which may be traced from ground at armature 410 and its make contact, armature 407 and its break contact, armature 423 and its make contact, upper winding of relay 419, conductor 603, cable 499, through relay 606, to negative battery.

Relay 606 will now energize in series with the upper winding of relay 419 and function to remove negative battery from conductor 602 and all marker relays associated with the lockout circuit LOC. Relay 419 will, however, remain operated because of the energization of its upper winding. The principal function of the marker relay 419 is to so condition the bank of the sender switch SEN—1 that the retransmission equipment will function to transmit the four-digit number distinctive of the box associated therewith. For this reason the make contacts associated with armatures 424, 425, 426, and 427 have been connected by way of the cross-connecting frames CCF to certain contacts in the marker bank of the sender switch SEN—1, thereby establishing the four-digit number 2222.

With reference to the sender switch SEN—1, it will be noted that wipers 500, 501, and 502 are normally standing on the last contact of their respective banks, while wipers 503, 504, and 505 are normally standing adjacent to the first contact of their respective banks. As all wipers are fixed in the relation shown, and driven by a common operating magnet, it follows that the first twenty-five steps thereof will advance wipers 503, 504, and 505 over their respective banks and into engagement with the last contact therein, and that the next twenty-five steps of the operating magnet will advance wipers 500, 501, and 502 over their respective banks and again into engagement with the last contact therein.

From the foregoing explanation it is evident that radial box relay group RBR, associated with radial box RB—1 having the numerical designation 2222, has seized the retransmitting equipment and locked out for the time being series box group SBR.

*Retransmission over retransmitting trunk*

The retransmission trunk RTT, extending between the district office and fire alarm headquarters, is normally supervised by a circuit extending from ground at the lower winding of relay 700, conductor 701, cable 799, armature 607 and its break contact, high resistance relay 608, armature 609 and its break contact, conductor 702, cable 799, through the upper winding of relay 700 to negative battery. Relay 700 will not operate at this time because of the high resistance of relay 608. The latter relay is normally energized and, in case of trunk failure, will deenergize and close a circuit by way of armature 610 and its make contact to supervisory lamp 611. The verification trunk VT is normally supervised in the same manner by relay 612 and lamp 613.

As before explained, the seizure of the transmitting equipment by the radial box relay group RBR resulted in the energization of relay 606, thereby closing an obvious circuit to relay 614. The latter relay then energizes and closes a circuit from ground at the make contact of armature 615, armature 616 and its break contact, through relay 617 to battery. Whereupon relay 617 energizes and removes relay 608 from across the retransmission trunk RTT and extends the same to the sender switch SEN—1 by way of conductors 518 and 519.

A further result of the energization of relay 614 is the closure of a circuit extending from ground at the make contact of armature 618, armature 619 and its break contact, conductor 620, through start relay 506 to negative battery. The primary function of the start relay 506 is to set in motion a self-interrupting group of relays, consisting of relays 511, 513, and 515, which will produce pulses at the high rate of speed desired for sending box numbers over the retransmission trunk RTT. The start circuit may be traced from ground at armature 507 and its break contact, armature 508 and its make contact, armature 509 and its break contact, break contact and armature 510, through relay 511 to negative battery. Relay 511, upon energizing, provides a locking circuit for itself at armature 512 and closes an obvious circuit through relay 513. The latter relay, upon energizing, closes the circuit of relay 515, at armature 514, whereupon relay 515 energizes and opens the circuit of relay 511 at armature 510. Relay 511 will next deenergize and open the circuit of relay 513, which, in turn, will deenergize and open the circuit of relay 515. The deenergization of the latter relay will again close the circuit of relay 511, thus the cycle will repeat and relays 511, 513, and 515 will function as an interrupter so long as start relay 506 is maintained in an energized position. It will be noted that at each operation of relay 511 a pulse of current is passed to the operating magnet 563 of the sender switch SEN—1 by way of armature 516, and that at each energization of relay 513 a momentary closure of the retransmission trunk conductors 518 and 519 will occur at armature 517 and its make contact.

The operating magnet 563 will energize on the first pulse delivered by interrupter relay 511 and, upon deenergizing, will cause wipers 500 to 505, inclusive, to advance one step. Disregarding the marker bank for the moment, it may be said that the operating magnet will continue to function, under control of the interrupter, to advance its wipers step by step over their respective bank contacts, and that previous to each step a momentary closure of the retransmission trunk conductors will occur at armature 517. This momentary closure of the retransmission trunk will be termed pulses, and it will next be shown that the marking established by relay 419 will cause the sender to transmit over the retransmission trunk a train of pulses representing the box number 2222. The first marking point will be reached upon the second step of the sender, when wiper 503 engages bank contact 533, and at that time a circuit may be traced from ground at armature 427 and its make contact, jumper 428 in the cross-connecting frame CCF, conductor 520, cable 599, bank contact 533, and wiper 503, through relay 521 to negative battery. Relay 521 will now energize and lock itself up by way of make contact and armature 522, break contact controlled by armature 523, make contact and armature 524 to ground. The first function of relay 521 is to open the start circuit to interrupter relays 511, 513, and 515 at armature 507. Because of the locking circuit of relay 511 the interrupter will complete its cycle and, upon coming to rest, will have passed two pulses to the retransmission trunk by way of armature 517.

A second function of relay 521 is to close the circuit of slow-to-operate relay 525, and, previous to the operation of this relay, a momentary circuit is closed from ground at armature 526 and its make contact, break contacts controlled by armature 527, conductor 621, break contact and armature 622 to the operating magnet 636 of the sequence switch SEQ—1. The operating magnet will energize on this pulse, and upon de-energizing, will advance wipers 623, 624, and 625 one step into engagement with their respective first bank contacts.

A further function of relay 521 is to close a circuit extending from ground on the bank contact occupied by wiper 504, wiper 504, armature 529 and its make contact, through self-interrupting contacts and the operating magnet 563 to negative battery. The operating magnet will now energize and act as a buzzer to advance its wipers at high speed so long as wiper 504 engages bank contacts carrying direct ground. When contact 532 is reached by wiper 504 the rotation will cease, for at this time the circuit to ground is complete by way of high resistance delay relay 531. The delay relay will energize in series with the operating magnet and cause armatures 534 and 535 to strike their respective vibrating contacts. The vibrating contact associated with armature 534 is weighted to give what will be termed a short delay in the operation of slow-to-operate relay 536 i. e., a delay suitable to establish the space between the digits of the outgoing code. The vibrating contact associated with armature 535 is weighted to give what will be termed a long delay in the operation of slow-to-operate relay 536, i. e., a delay suitable to establish the space between repetitions or rounds of the outgoing code. After a slight delay, following the energization of relay 531, an effective circuit is completed from ground at wiper 505, bank contact 537, armature 534 and its vibrating contact, through slow-to-operate relay 536 to negative battery. Relay 536, upon energizing, will open the locking circuit of relay 521 at the break contact controlled by armature 523. Relay 521 will now deenergize and function to open the circuit of relay 525 and again supply starting ground to the interrupter relays 511, 513, and 515.

Upon the completion of the first delay interval the sender will again start stepping under control of the interrupter relays and will proceed to send the second digit of the four-digit box number. Relays 531 and 536 will deenergize at the first step of wipers 504 and 505. Upon the second step of the sender switch wiper 503 will engage bank contact 538 which has been grounded by marker relay 419 by way of armature 426 and its make contact, jumper 429, conductor 539, and cable 598. Whereupon relay 521 will again function to stop interrupter relays 511, 513, and 515; to pass a second pulse of current to the operating magnet of the sequence switch SEQ—1; and to cause the sender switch to advance at high speed to the next stopping point, which is reached when wiper 504 engages bank contact 551. Whereupon delay relays 531 and 536 will again function to introduce a suitable delay between the second and third digits of the outgoing code.

Upon the completion of the second delay interval the sender will again start stepping under control of the interrupter relays and will proceed to send the third digit of the four-digit box number. Upon the second step of the sender switch wiper 503 will engage bank contact 541 which has been grounded by marker relay 419 by way of armature 425 and its make contact, jumper 430, conductor 542, and cable 597, whereupon relay 521 will again function to stop interrupter relays 511, 513, and 515; to pass a third pulse of current to the operating magnet of sequence switch SEQ—1; and to cause the sender switch to advance at high speed to the next stopping point, which point will be reached when wiper 501 engages bank contact 552. Whereupon delay relays 531 and 536 will again function to introduce a suitable delay between the third and fourth digits of the outgoing code.

Upon the completion of the third delay interval the sender will again start stepping under control of the interrupter relays and will proceed to send the fourth digit of the four-digit box number. Upon the second step of the sender switch wiper 500 will engage bank contact 544 which has been grounded by marker relay 419 by way of armature 424 and its make contact, jumper 431, conductor 545, and cable 596. Whereupon relay 521 will again function to stop interrupter relays 511, 513, and 515; to pass a fourth pulse of current to the operating magnet of sequence switch SEQ—1; and to cause the sender switch to again advance at high speed. The further operation of the sender switch will be disregarded for the time being, and a resume will next be presented covering the operation of the retransmission trunk.

It has been shown that the retransmission trunk RTT terminates at fire alarm headquarters in the normally deenergized line relay 700; that it is normally supervised at the district office by high resistance relay 608; and, further, that the seizure of the retransmitting equipment by a box relay group, such as RBR, caused the removal of supervisory relay 608 from across the retransmission trunk, and the extension of that trunk as an open circuit to impulsing springs 517 of the sender switch SEN—1.

It has also been shown that the sender, under control of the aforementioned box relay group, has impressed upon the retransmission trunk, by means of open circuit pulses, the four-digit code 2222, representative of the box number of the originating box.

*Operating of code register*

Line relay 700 of the code register CR will respond to the open circuit pulses representative of the box number 2222 and its first energization will close a circuit from ground at make contact and armature 703 through slow-to-release relay 704 to negative battery; a circuit parallel thereto is also closed by way of armature 705 and its break contact to operating magnet 706 of minor switch M—1. Slow-to-release relay 704 will energize and close a circuit from ground at armature 707 and its break contact, armature 708 and its make contact, armature 709 and its break contact, to the differential circuit of relay 710, which is without effect at this time. Operating magnet 706 will energize at this time and advance wiper 711 into engagement with the first contact in the bank associated therewith. The off-normal springs 712 will engage at the first energization of operating magnet 706 and complete a circuit through alarm lamp 729 and relay 730 to negative battery. Relay 730 closes the circuit of an audible alarm signal SG—3, thereby providing both an audible and a visual indication that a box code is being sent from the district office.

The operating magnet 706 will respond to subsequent pulses comprising the first digit and will advance the wiper 711 step by step in accordance therewith. Slow-to-release relay 704 will remain energized during the reception of the pulses comprising the first digit of the code, but will deenergize shortly after the last pulse is received and open the differential circuit of relay 710. The latter relay will then fully energize and lock itself up to ground at the off-normal spring 712 of the minor switch M—1. Relay 710 functions to extend the transfer circuit to relay 713, and to extend the operating circuit to the operating magnet 714 of minor switch M—2. A further result of the energization of relay 710 is the completion of a circuit from ground at armature 707 and its break contact, make contact and armature 725, wiper 711 and the bank contact on which it is standing to the second lamp in the first digit display panel.

Line relay 700, in responding to the pulses representing the second digit of the code, will again close the circuit of slow-to-release relay 704; a circuit parallel thereto is also closed by way of armature 705 and its make contact, armature 715 and its break contact, through operating magnet 714 of minor switch M—2 to negative battery. Slow-to-release relay 704 will energize and close the transfer circuit by way of armature 708 and its make contact, armature 709 and its make contact, armature 716 and its break contact to the differential circuit of relay 713, which is without effect at this time. The operating magnet 714 will respond to the two impulses of the second digit and advance wiper 717 into engagement with the second bank contact of the associated bank. Slow-to-release relay 704 will deenergize shortly after the last pulse of the digit and open the differential circuit of relay 713. The latter relay will then fully energize and lock itself up to ground at the off-normal spring 712 of the minor switch M—1. Relay 713 functions to extend the transfer circuit to relay 718 and to extend the operating circuit to the operating magnet 719 of minor switch M—3.

A further result of the energization of relay 713 is the completion of a circuit from ground at armature 707 and its make contact, make contact and armature 726, wiper 717 and the bank contact on which it is standing, to the second lamp in the second digit display panel.

Line relay 700, when responding to pulses representing the third digit of the code will again close the circuit of slow-to-release relay 704; a circuit parallel thereto is also closed by way of armature 705 and its make contact, armature 715 and its make contact, armature 720 and its break contact, through operating magnet 719 of minor switch M—3 to negative battery. Slow-to-release relay 704 will energize and close the transfer circuit by way of armature 708 and its make contact, armature 709 and its make contact, armature 716 and its make contact, armature 720 and its break contact to the differential circuit of relay 718, which is without effect at this time. The operating magnet will respond to the two pulses of the third digit and advance wiper 721 into engagement with the second bank contact of the associated bank. Slow-to-release relay 704 will deenergize shortly after the last pulse of the digit and open the differential circuit of relay 718. The latter relay will then fully energize and lock itself up to ground at the off-normal spring 712 of the minor switch M—1. Relay 718 functions to extend the operating circuit to the operating magnet 722 of minor switch M—4. A further result of the energization of relay 718 is the completion of a circuit from ground at relay 707 and its make contact, make contact and armature 727, wiper 721 and the bank contact upon which it is standing to the second lamp in the third digit display panel.

Line relay 700, when responding to pulses representing the fourth digit of the code, will again close the circuit is slow-to-release relay 704; a circuit parallel thereto is also closed by way of armature 705 and its make contact, armature 715 and its make contact, armature 720 and its make contact, through operating magnet 722 of minor switch M—4 to negative battery. Slow-to-release relay 704 will energize, but without effect. The operating magnet will respond to the two pulses of the fourth digit and advance wiper 723 into engagement with the second contact of the associated bank. Slow-to-release relay 704 will deenergize shortly after the last pulse of the digit and close a circuit from ground at armature 707 and its break contact, armature 708 and its break contact, make contact and armature 728, wiper 723 and the contact upon which it is standing, to the second lamp in the fourth digit display panel.

The call register has now fully responded to the four-digit box code retransmitted by the sender SEN—1, and the associated display panel has been illuminated to display the box number 2222 indicative of radial box RB—1.

Facilities for retransferring from the sender SEN—1 to a spare or reserve sender are provided in the form of locking key K—60 and relay 654.

*Retransmission over verification trunk*

It has previously been shown that the sender switch SEN—1 passed one impulse of current to the operating magnet 636 of sequence switch SEQ—1 after retransmitting each digit of the box number. The fourth pulse transmitted occurs at a time when wiper 625 is in engagement with the third contact in the bank associated therewith. It follows, therefore, that a parallel circuit is closed by way of wiper 625, bank contact 626, break contact controlled by armature 627, through relay 628 to negative battery. Relay 628 will energize and lock itself up from the grounded bank contact occupied by wiper 623, at the same time closing an obvious circuit through relay 629. The latter relay, upon energizing, will open the circuit of relay 617, which will now deenergize and in so doing disassociate the retransmission trunk RTT and the sender SEN—1. A further result of the energization of relay 629 is the removal of supervisory relay 612 from across the verification trunk VT, and the extension of that trunk to the sender switch SEN—1 by way of conductors 518 and 519. A further result of the energization of relay 628 is the closure of a circuit from ground at the make contact of armature 630, armature 631 and its break contact, conductor 632, through relay 546 to negative battery. The latter relay will now energize and prepare a circuit extending to the slow-to-operate interrupter relays 547, 548, and 549.

At the moment when we discontinued our previous discussion of the sender switch SEN—1 it was advancing its wipers at high speed after having retransmitted the last digit of the four-digit box number. When contact 550 is reached by wiper 501 the rotation will cease for, at this time, the circuit to ground is completed by way of armature 553 and its make contact, and delay relay 531. The delay relay will energize in series with the operating magnet, and, after a long delay, an effective circuit is completed from ground at wiper 502, bank contact 554, armature 535 and its vibrating contact, through slow-to-operate relay 536 to negative battery. The long delay introduced by the circuit change from armature 534 to armature 535 is intended to provide a delay suitable to establish the space between repetitions or rounds of the outgoing code.

Upon the completion of the first round delay interval the sender will again start stepping, but now is under control of a slow speed self-interrupter relay group consisting of relays 547, 548, and 549. It is to be noted that the circuit from armature 509 is now extended by way of its make contact, conductor 562, break contact and armature 555, through non-inductive resistance 559 in parallel with relay 548 to negative battery; a circuit in parallel therewith extends from make contact and armature 556, through non-inductive resistance 560 in parallel with relay 549 to negative battery; a circuit in parallel therewith also extends from make contact and armature 557, through non-inductive resistance 558 in parallel with relay 547 to negative battery. Relays 547, 548, and 549 are of the same mechanical and electrical structure, but owing to the lighter spring load of relay 548 it will be the first to energize, thereupon establishing a cyclic operation wherein at any given instant two, and only two, of the three relays are in an operated position. Relay 548 will first energize, thereby opening the circuit of relay 549 at armature 556. It follows then that relay 547 must next energize, and in so doing opens the circuit of relay 548 at armature 555. Relay 548 deenergizes shortly after its circuit is opened, and at armature 556 reestablishes the circuit of relay 549. The latter relay operates, after an interval, and at armature 557 opens the circuit of relay 547. The deenergization of the latter relay again completes the circuit of relay 548 at armature 555, and the cycle will continue as long as positive battery is maintained on conductor 562.

The exact sequence of operation of relays 547, 548, and 549 is of no great importance and it may be merely pointed out that at each cycle a pulse of current is passed to the operating magnet 563 by relay 547 over an obvious circuit, and that each operation of relay 549 a circuit is closed from ground at the lower winding of line relay 724, conductor 633, armature 634 and its make contact, conductor 519, break contact and armature 561, conductor 518, make contact and armature 635, conductor 731, through the upper winding of line relay 724 to negative battery. Line relay 724, upon each energization, actuates the conventional open circuit punch register PR—70, and it follows therefore that the interrupter consisting of relays 547, 548, and 549 must produce pulses of a character suited to the operation of this instrument.

Upon the second step of the sender switch SEN—1 wiper 503 will engage the marked bank contact 533, whereupon relay 521 will function to stop interrupter relays 547, 548, and 549; to pass a fifth pulse of current to the operating magnet of sequence switch SEQ—1; and to cause the sender switch to advance at high speed to the next stopping point, which will be reached when wiper 504 engages bank contact 532. Whereupon delay relays 531 and 536 will again function to introduce a short delay between the first and second digits of the outgoing code. The sender SEN—1 will continue in the manner already described to retransmit the remaining digits of the second round of the box number, a pulse of current being passed to the motor magnet of the sequence switch SEQ—1 at the completion of each digit. At the end of the second, and each succeeding round, the sender will introduce a long delay to establish a distinctive space between rounds. Line relay 724 will respond to the open circuit pulses received over the verification trunk and will cause the punch register PR—70 to perforate a moving tape in accordance with the code received. The perforations within a digit will be separated as determined by the speed of the impulse producing relays 547, 548, and 549, the short space between digits will be determined by armature 534 to delay relay 531 and the long space between rounds will be determined by armature 535 of the same relay.

*Acknowledgment by fire alarm headquarters*

The attention of the attendant at fire alarm headquarters will first be attracted by the lighting of the alarm lamp 729 and the sounding of the audible signal SG—3; he will next see the box number appear, one digit after the other, on the display panel associated with the call recorder CR; and finally may verify that indication by comparison with the permanent record of the box number made by the punch register PR—70.

When the matter of verification has been established the attendant at fire alarm headquarters will momentarily depress the release key K—70, thereby closing an obvious circuit through relay 732 to negative battery. The latter relay will energize and, by way of make contact and armature 733, will lock itself up to ground at off-normal spring 712 of minor switch M—1. The display lamps will next be extinguished, and relays 710, 713, and 718 will deenergize, because of the removal therefrom of ground at armature 707. And, finally, parallel circuits will be closed from ground at make contact and armature 734, through release magnets 735, 736, and 738, to negative battery. Each of the release magnets will now energize and cause the wiper associated therewith to restore to normal position, thereby opening the associated off-normal spring contact. Relay 732 will deenergize when the last minor switch returns to normal position, and the call recorder will then be in position to respond to further codes which may be transmitted over the retransmission trunk.

A further result of the momentary operation of K—70 is the release of the sender SEN—1, the actuating circuit extending by way of conductor 637, cable 799, through relay 638 to negative battery. Relay 638, upon energizing, will lock itself up by way of make contact and armature 639, through wiper 623 and the contact upon which it is standing to positive battery. As it would be inadvisable to stop the sender in the middle of a round, thereby leaving an unfinished code on the punch register tape, the energization of relay 638 merely prepares a circuit from the bank associated with wiper 625. It will be noted that contacts 640, 641, 642, 643, and 644 have been tied together, and, remembering that an impulse of current is passed to the motor magnet 636 each time a digit is retransmitted by the sender SEN—

1, it follows that a circuit will be closed, subsequent to the time that wiper 625 next engages either of the aforementioned bank contact, from the next pulse received thereafter on conductor 621, break contact and armature 622, wiper 625 and the contact on which it is standing, armature 645 and its make contact, break contact controlled by armature 646, through relay 647 to negative battery.

Relay 647, upon energizing, will lock itself up by way of armature 646, wiper 623 and the bank contact upon which it is standing, to positive battery, and will function to disconnect radial relay group RBR from the sender SEN—1 and bring about the release of the latter and of the sequence switch SEQ—1. The immediate circuit may be traced from ground at armature 600 and its make contact, conductor 604, make contact and armature 432, through the upper winding of relay 433 to negative battery. The latter relay, upon energizing, will lock itself up by way of make contact and armature 434 to ground at armature 410, and will open the circuit of relays 409, 419, and 606 at armature 407. Relay 409, upon deenergizing, will extinguish the fire alarm lamp FAL—1, as an indication to the district office that fire alarm headquarters has acknowledged the alarm. Relay 419 will now deenergize and remove its marking from the marker bank of sender switch SEN—1. Upon the deenergization of relay 409 all relays of the radial relay group RRG will again be in normal position; and the chain circuit, forming a part of the lockout circuit LOC, is again completed at the break contact of armature 421.

Relay 606, upon deenergizing, replaces negative battery upon lockout conductor 602 which is without effect at this time; and opens the circuit of relay 614 at armature 605. The latter relay then deenergizes and closes a circuit from ground on the bank contact occupied by wiper 623, said wiper, break contact and armature 648, through self-interrupter contacts and the operating magnet 636 to negative battery. The operating magnet will now energize and act as a buzzer to advance its wipers to the ungrounded bank contact 649, which is the normal position of the sequence switch SEQ—1. The consequent removal of ground from wiper 623 causes the deenergization of relays 647, 628, and 638, and the sequence switch is now in position to be seized by another box relay group.

A further result of the deenergization of relay 614 is the opening of the circuit to start relay 506 which, upon deenergizing, will open the circuit to the interrupter relays 547, 548, and 549 at armature 508; and close a restoring circuit traceable from ground at the bank contact upon which wiper 504 is standing, wiper 504, break contact and armature 564, through self-interrupting contacts and the operating magnet 563 to negative battery. The operating magnet will now energize and act as a buzzer to advance its wipers to the ungrounded bank contact 550, which is the normal position of the sender switch SEN—1. It may be mentioned that bank contacts 532, 551, and 552 are at this time grounded by way of armature 524 and its break contact. The deenergization of relay 647 again places ground on the chain circuit by way of armature 600 and, because of our assumption that relays 409 and 415 originally energized simultaneously, a circuit may be traced by way of conductor 691, armature 421 and its break contact, armature 435 and its make contact, through the lower winding of relay 420, conductor 602 to negative battery at armature 605. Relay 420 will now energize and complete the seizure of the retransmitting equipment, to the exclusion of all other box relay groups.

It has been shown that a fire alarm originating at radial box RB—1 will be indicated at the district office by the lamp FAL—1 and the audible signal SG—1; that a code corresponding thereto will be retransmitted at high speed and visually displayed at fire alarm headquarters; that the same code will afterwards be repeated at low speed and a permanent record thereof made at fire alarm headquarters; and finally, that fire alarm headquarters may acknowledge such verification, and in so doing cause the restoration to normal of all the apparatus associated with the same fire alarm.

In the event that fire alarm headquarters does not acknowledge after the second round of the box number is received on the punch register, it may be pointed out that the sender SEN—1 will continue to retransmit over the verification trunk and that eventually wiper 624 of the sequence switch SEQ—1 will engage bank contact 650 thereupon establishing a circuit from ground at armature spring 600 and its break contact, bank contact 650, wiper 624, through relay 651 to negative battery. The latter relay, upon energizing, will lock itself up to break springs of key K—61, and close the circuit of the alarm lamp 652 at armature 653. The lighting of lamp 652 will indicate that fire alarm headquarters has not yet responded, and the district office will establish telephone communication therewith by inserting the calling plug CP of the cord circuit CC, Fig. 8, into jack J—60 of the two-way trunk TWT extending to fire alarm headquarters.

In the event that the second round received on the punch register does not verify the box numbers previously set up on the display panel, telephone communication will be established with the district office by inserting jack P—70 of the operator's telephone circuit OT—1, Fig. 7, into jack J—70 of the previously mentioned two-way trunk.

*Retransmission of series box alarm*

The retransmission of the four-digit series box number marked by the cross connections from the springs of relay 420 need not be described in detail as the sequence switch SEQ—1, the sender SEN—1, the code register CR and the punch register PR—70 function in a manner similar to that described in connection with the retransmission of the box number marked by radial relay group RBR. It may be pointed out, however, that the operation of the verification key K—70 at fire alarm headquarters will ultimately bring about the energization of relay 436 by way of conductor 604 and armature 437. The energization of relay 436 will open the circuit of relays 413, 415, 420, and 606 and will thereby bring about the disassociation of relay group SBR and the retransmitting equipment. The extinguishment of lamps 416 and 418 will be an indication to the attendant at the district office that fire alarm headquarters has acknowledged the alarm. Test key K—40 is in association with relay group SBR in order that the attendant at the district office may forestall the retransmission of an alarm by deenergizing relay 413 each time it is energized, thus preventing the operation of relay 415 during the four rounds resulting from a test pull of the fire alarm box SB—1.

Telephone communication from radial box

The opening of the radial box circuit RBC, which may occur either because of a line fault or as the result of plugging the portable telephone TEL into line jack J—20 and momentarily operating key K—20, will cause the deenergization of both relay 400 and relay 403. As before explained, the deenergization of relay 400 will light the alarm lamp FAL—1 and cause the sounding of the audible signal SG—1. The deenergization of relay 403 will prevent the energization of relay 409 and the subsequent initiation of a fire alarm, and will close a circuit from ground at the break contact of armature 438, conductor 439 through lamp TAL—1 and relay 299 to negative battery. Relay 299 closes the circuit of an audible alarm signal SG—2 indicative of a trouble alarm, while the illumination of the lamp TAL—1 indicates the particular radial box circuit that is in trouble.

The attendant at the district office, in response to the foregoing, will insert the answering plug AP of an idle cord circuit, such as indicated at CC, Fig. 8, into the radial test jack RTJ. The alarm signals, both fire and trouble, will now be cut off as the result of the establishment of the following circuits. A circuit is first closed from ground at the lower sleeve of plug AP, lower sleeve of jack RTJ, conductor 441, through the lower winding of relay 433 to negative battery. The function of relay 433 at this time is to shunt resistance 401 at armature 442; to shunt resistance 404 at armature 443; and to prevent the possible initiation of a fire alarm by opening the circuit of relay 409 at armature 407. At this time the circuit of relays 400 and 403 is completed by way of conductor 402, upper tip of jack RTJ and plug AP, through break springs of key K—80, break springs of key K—81, break springs of key K—82, lower tip of plug AP and jack RTJ to conductor 405. It follows then that an "in test" can be made of radial relay group RBR. The operation of key K—80 is the equivalent of pulling a radial box as it inserts resistance 800, equal in value to resistance 204, in the circuit of relays 400 and 403. The operation of key K—81 serves to open the aforementioned circuit.

When the plug AP is inserted in jack RTJ the box circuit RBC is extended by way of the ring conductors of the jack and plug, and break springs of key K—84, to the battery feed relay 801, the windings of which are appropriate for feeding talking battery to the portable telephone TEL.

The attendant will next operate the talk key K—83, thus bridging the operator's telephone circuit OT—2 across the radial box circuit, and challenge; in the event that a reply is received a conversation may be carried on or the connection extended to fire alarm headquarters by the insertion of the calling plug CP into jack J—80 of the two-way trunk.

If there is no answer to the challenge the attendant will release key K—83 and operate key K—84, thereby extending the radial box circuit to the test panel TP. By the further operation of keys thereon the usual routine lines tests may be made, as, for instance, the foreign potential test established by key K—89.

Telephone communication from series box

A long continued break in the series box circuit SBC, which may occur either because of a line fault or as the result of plugging the portable telephone TEL into line jack J—21 and the subsequent operation of key K—20, will result in the deenergization of line relay 304 and the closing of the previously described circuit to slow-to-operate relay 308, to lamp TAL—2 in series with relay 299, to relay 311, and to vertical magnet 328. Relay 299, upon energizing, will close the circuit of the audible alarm signal SG—2 indicative of a trouble alarm, while the illumination of the lamp TAL—2 indicates the particular series box circuit that is in trouble. The eventual operation of slow-to-operate relay 308 will open the circuit to relay 311 and to the vertical magnet 328, and, upon energization of relay 303, a previously traced circuit will be established to the release magnet 330. As a result of the foregoing the connector will function to take one vertical step and then release, thus only momentarily closing the circuit of the fire alarm lamp FAL—2.

The attendant at the district office, in response to the continued burning of the trouble alarm lamp TAL—2, will insert the answering plug AP of an idle cord circuit, such as indicated at CC, Fig. 8, into the series test jack STJ. A circuit is thereby established from the lower sleeve contact of the plug and jack to relay 231, which will energize and remove the shunt from around impedance 225. For the purpose of the present explanation we will assume that the line break occurred as the result of the operation of key K—20, following the plugging in of portable telephone TEL into jack J—21. Upon the restoration of key K—20 the line circuit is again completed and relay 304 will energize in series with the impedance 225 and function to open the circuit of trouble alarm lamp TAL—2 and relay 299. Line relay 304, in series with impedance 225, will function as an appropriate battery feed to supply talking battery to the portable telephone TEL, it being remembered that at this time each series box on circuit SBC is shunted out by a pair of protective contacts similar to that indicated at reference 206.

The attendant will next operate the talk key K—83, thus bridging the operator's telephone circuit OT—2 across the series box circuit SBC by way of the ring conductors of the plug and jack and talking condensers 232 and 233, and challenge; in the event that a reply is received a conversation may be carried on or the connection extended to a fire alarm headquarters by the insertion of the calling plug CP into jack J—80 of the two-way trunk. The establishment of the telephone connection will in no way interfere with the normal operation of the series circuit for fire alarm purposes, as line relay 304 is in readiness at all times to respond to box codes.

In the event that no response is received to the challenge, the attendant will restore the talk key K—83 and operate the test key K—84, thereby closing a circuit from ground over the upper sleeve of the plug and jack, through relay 234 to negative battery. The latter relay, upon energizing, will shunt condenser 232 at make contact and armature 223; and will shunt condenser 233 by way of break contact and armature 227, and make contact and armature 226; thus extending the series circuit SBC by way of the ring-conductors of the jack and plug, and make springs of key K—84 to the test panel TP. By further operation of keys thereon the usual routine line tests may be made as, for instance, the foreign potential test established by key K—89.

At this time an "in test" can be made, for a further function of relay 234 resulted in the bridging of the series fire alarm box SB—2 in series with the compensating resistance 235, equal in value to the resistance of the circuit SBC, across conductors 301 and 305 by way of armatures 236 and 237. The test box SB—2 may be common to the district office, and preferably is equipped with a code wheel cut to send the code 00. For the receipt of this code a single series box relay group may be provided, similar to that shown at SBR of Fig. 4, but so connected that it would be seizable from the 00 contact of any connector bank. This test relay group would preferably be cross-connected to retransmit some distinctive code recognized as a test box number, for instance, the number 0000.

Series box alarm, ground operation

In the event that the attendant finds the series box circuit open because of a line fault, he will restore test key K—84 and change the method of operation from "metallic," as heretofore described to "ground operation" by actuating the ground operating key K—82, thereby extending ground by way of the lower tip of the plug and jack, through relay 238 to negative battery. Relay 238, upon energizing, will connect together the two sides of the series box circuit at armature 239 and its make contact, and will in addition disconnect the upper terminal of line relay 304 from line conductor 228 at the break contact of armature 227, and connect the said terminal of relay 304 to ground at the make contact of the said armature. At this time relay 304 will be deenergized and, as before explained, relays 308 and 299 will be energized, the trouble alarm lamp TAL—2 will be illuminated and the connector will again be at normal, after having taken one vertical step followed by a release operation. A further result of the energization of relay 238 is the closing of a circuit to guard lamp GL.

The pulling of series box SB—1, at a time when the circuit is conditioned for "ground operation" will result, as before, in the opening of the protective shunt contact 206 and at the same time grounded contact 240 is brought into engagement with signaling contact 208 which at this time is still in engagement with signaling contact 207. A circuit will now be extended through one winding or the other of magnet 241 (depending upon which line conductor is open), by way of line paralleling armature 239 and its make contact, break contact controlled by armature 223, conductor 301, variable resistance 300, individual battery B, line relay 304, conductor 305, impedance 225, break contact controlled by armature 226, through armature 227 and its make contact to ground. The current flowing in this circuit will energize both magnet 241 and line relay 304.

The box mechanism will next start rotation and the signaling lever 209 will fall into engagement with the periphery of the code wheel 210, at which time signalling contact 208 will disengage both signaling contact 207 and grounding contact 240. Thus the circuit of line relay 304 is broken irrespective of which line conductor may be open at this time. The further operation of the series box SB—1 and of the connector switch CS need not be again explained, as the latter will function in response to the pulses produced by the code wheel 210 in the same manner as previously explained in connection with the metallic operation of the series box.

Manual transmission over alarm circuit

The discussion up to this point has caused the initiation of a fire alarm, either by way of a radial or a series box circuit, and the retransmission of the corresponding box number to fire alarm headquarters.

We will now consider the normally closed series alarm circuit AC, Fig. 11, which connects all fire stations with fire alarm headquarters. The equipment at fire alarm headquarters consists of the individual ungrounded battery B—1, the coding relay 1100, and audible signaling device SD—1. The equipment at each fire station, as indicated at FS—1, consists of the punch register PR—1100 and the audible signaling device SD—2.

Referring again to the code register CR, Fig. 7, it will be remembered that the box number 2222 was first caused to appear on the visual display associated therewith, and subsequently a permanent record was made thereof by the punch register PR—70. We will now assume that the operator at fire alarm headquarters desires to manually transmit two rounds of that box number to all fire stations over the alarm circuit AC, and therefore depresses the second key in each of the rows designated "round," "thousands," "hundreds," "tens," and "units" in Fig. 9.

To digress for a moment, attention is directed to the continuously operating self-interrupting relay 1000 of Fig. 10, the energizing circuit thereof extending from ground at break springs controlled by armature 1001, resistance 1002, and through said relay to negative battery. Relay 1000, upon energizing, shunts itself at armature 1003 and its make contact, and since it is of the pendulum type, continues to oscillate at a speed suitable for the proper operation of punch register PR—1100. At each operation of relay 1000 negative battery will be placed on conductor 900, cable 908, and thence through pilot lamp 901 to positive battery.

Attention is also directed to the means employed to mark the bank of the sender switch SEN—2, and in this connection it will be noted that the level springs of a given row of sending keys are associated with like contacts of the corresponding level in the bank of the code sender SEN—2.

As illustrated in the "thousands" row, the lever spring of keys 1 to 0, inclusive, are connected in order, by way of cable 1101, to bank contacts 1 to 0, inclusive, of that bank of the sender switch SEN—2 which is accessible to wiper 1102. The sending keys of each row have break contacts wired in series, and therefore, with all keys at normal positive ground from the break spring of the key 0 is carried to each contact in the marker bank level of the sender switch SEN—2 associated therewith. The rounds keys are connected in a similar manner, by cable 1004, to that level in the bank of the rounds sequence switch SEQ—2 which is accessible to wiper 1005.

The operator at fire alarm headquarters, after having verified the set up by an inspection of the sending keys, now locked in their depressed position, will next momentarily depress the non-locking start key Start, thereby extending ground by way of conductor 1006, cable 908, to slow-to-operate start relay 1007; a circuit parallel thereto is also closed by way of armature 1008 and its break contact, bank contact 1009, wiper 1005, through self-interrupting springs and operating magnet 1010 of the rounds sequence switch SEQ—2 to negative battery. Whereupon the operating magnet becomes energized, interrupts its own circuit, and advances its wipers one step upon deenergization. The off-normal springs 1017 close at this time and prepare a locking circuit for relay 1007. Wiper 1005 will not at this time find ground on the first bank contact because of the open circuit at the second key in the Rounds row.

Slow-to-operate relay 1007 will eventually energize and lock itself to off-normal spring ground by way of armature 1008 and its make contact, and will close a circuit from ground at the make contact of armature 1011, conductor 902, cable 908, through the off-normal lamp 903 to negative battery. Relay 1007 also, by means of the make-before-break springs controlled by armature 1001, substitutes pulsing relay 1012 for the resistance 1002. Owing to the high resistance of relay 1000, relay 1012 can neither energize, nor will it remain energized, in series therewith, but will operate each time armature 1003 shunts out relay 1000.

At the first energization of pulsing relay 1012 a circuit is closed from ground at the make contact of armature 1013, break contact and armature 1014, armature 1015, and its break contact, wiper 1016 and the first contact in its bank conductor 1103, bank contact 1104, wiper 1105, through operating magnet 1106 of the sender sequence switch SEQ—3 to negative battery. As a result of this pulse, or the next succeeding pulse of sufficient length, the operating magnet 1106 will fully energize and, at the end of the pulse, will deenergize and advance the associated wipers into engagement with the first contact in their respective banks. The off-normal springs 1107 now operate and close the circuit of relay 1108, which energize without effect at this time.

When the wipers of the sender sequence switch SEQ—3 advance to first position a kick-off circuit is closed from ground at the break contact of armature 1110, bank contact 1111, wiper 1102, bank contact 1112, wiper 1113, through the self-interrupting springs and operating magnet 1119 of the sender switch SEN—2 to negative battery. Whereupon the operating magnet becomes energized, interrupts its own circuit, and advances its wipers one step upon deenergization. Wiper 1102 will not at this time find ground on the first bank contact because of the open circuit at the second key in the Thousands row. The off normal springs 1114 now operate and close the circuit of relay 1115, which energizes and locks itself up by way of make contact and armature 1116, bank contact 1117, and wiper 1118 to ground.

At the next energization of the pulsing relay 1012 a circuit may be traced from ground at the make contact of armature 1013, break contact and armature 1014, conductor 1120, armature 1121 and its break contact, relay 1122, wiper 1123, bank contact 1124, bank contact 1125, wiper 1102, bank contact 1112, wiper 1113, through the self-interrupting springs and operating magnet 1119 of the sender switch SEND—2 to negative battery. Both relay 1122 and operating magnet 1119 will energize over the foregoing circuit, the latter without effect at this time, because relay 1122, due to its construction, will energize quicker than the operating magnet, and will shunt the self-interrupting springs of the latter at armature 1126 and its make contact. Relay 1122, upon energizing, will close a circuit from ground at the make contact of armature 1127, conductor 904, break springs of key Stop, through supervisory lamp 905 to negative battery; a circuit parallel thereto is also closed by way of conductors 1128 through the coding relay 1100 to negative battery. Relay 1100 will energize at this time and at armature 1129 will open the alarm circuit AC, thereby causing the operation of all punch registers and sounding devices connected in the circuit. At the end of the pulse relay 1122 and the operating magnet will deenergize and the sender SEN—2 will advance its wipers one step, the supervisory lamp 905 will be extinguished, and relay 1100 will deenergize and again close alarm circuit AC.

At the next energization of pulsing relay 1012 the circuit through relay 1122 in series with operating magnet 1119 is again closed, this time by way of back contact 1124 of the sender sequence switch SEQ—3, conductor 906, cable 1101, break spring of the first Thousands key, conductor 1130, bank contact 1131 to wiper 1102. Relay 1112 will function as before to light supervisory lamp 905 and close the circuit of coding relay 1100, which will again energize and open the alarm circuit AC. At the end of the pulse relays 1112 and 1100 will deenergize, and it is now apparent that code relay 1100 has now impressed two open circuit pulses on the alarm circuit, thus representing the first digit of the box number 2222.

When the operating magnet deenergizes, at the end of the pulse, the wipers of the sender SEN—2 will advance one step and a restoring circuit may be traced from ground at the break springs of the 0 key in the Thousands row, then break contacts of keys 0 to 3, inclusive, conductor 1132, cable 1101, wiper 1102, bank contact 1112, wiper 1113, through self-operating contacts and operating magnet 1119 to negative battery. The operating magnet will now energize and act as a buzzer to advance its wipers at high speed so long as wiper 1102 engages bank contacts connected to direct ground. When wiper 1102 reaches bank contact 1111 the circuit of the operating magnet is extended by way of armature 1110 and its make contact, through high resistance relay 1133 to ground. The operating magnet cannot energize at this time because of the high resistance of relay 1133, the latter relay will, however, energize and prepare the circuit of operating magnet 1106 of the sender sequence switch. The relation between the speed of the impulses produced by relay 1012 and that of the self-interruption of the operating magnet 1119 is such that the restoration of the sender switch will be completed before the next pulse is produced by relay 1012.

At the next energization of pulse relay 1012 a circuit is closed from ground at the make contact of armature 1013, break contact and armature 1014, conductor 1120, armature 1121 and its make contact, through operating magnet 1106 to negative battery. The operating magnet 1106 will now energize, and at the end of the pulse, will deenergize and advance its wipers into engagement with the second contact in their respective banks. It will be noted that wiper 1118 no longer supplies a locking circuit for relay 1115 which, upon deenergizing, again places direct ground upon bank contact 1111, but without effect as wiper 1113 no longer engages bank contact 1112. The deenergization of relay 1133 occurred when wiper 1113 passed from contact 1112.

At the next energization of pulse relay 1012 a circuit is closed from ground at the make contact of armature 1013, break contact and armature 1014, armature 1015 and its break contact, conductor 1134, bank contact 1135, wiper 1105, through operating magnet 1106 to negative battery. The operating magnet will now energize, and at the termination of the pulse will deenergize and advance the wiper of the sender sequence switch one step.

The operation so far described has had to do with the transmitting of the first digit of the box number 2222 over the alarm circuit AC. The cycle will now be repeated for the transmitting of the second digit of the box number. When the wipers of the sender sequence switch SEQ—3 advance to third position the kick-off circuit for the sender SEN—2 is completed from ground at the break contact of armature 1110, bank contact 1136, wiper 1137, bank contact 1138, wiper 1113, and through self-interrupting contacts and operating magnet 1119 to negative battery. Operating magnet 1119 thereupon functions to advance the wipers of the sender switch one step and close the off-normal springs 1114, relay 1115 energizes therefrom and prepares the circuit of relay 1133. At the next energization of pulsing relay 1012 the circuit through relay 1122 will be directed by way of wiper 1123, bank contact 1139, bank contact 1140, wiper 1137, bank contact 1138, wiper 1113, through self-interrupting contacts and operating magnet 1119 to negative battery. Relay 1122 will function as before to shunt the interrupter springs of the operating magnet, and will again close the circuit of relay 1109, whereupon the latter relay energizes to impress the first pulse of the second digit upon the alarm circuit AC. It may be mentioned here that the space between digits in the transmitted code is that established by two consecutive operations of pulsing relay 1012. Pulses will continue to be transmitted so long as wiper 1137 engages non-grounded bank contacts, and the restoration of the sender switch will occur when said wiper engages the first grounded bank contact. Relay 1133 will prevent the energization of operating magnet 1119, and will prepare the circuit of operating magnet 1106. The two succeeding pulses from relay 1012 will actuate operating magnet 1106, thus completing the second cycle.

The operation of the third and fourth cycles need not be explained in detail, as they constitute merely a repetition of what has been already described. The transmission of the four-digit box number is completed when wiper 1141 restores the sender switch to normal. The next pulse from relay 1012 will pass to operating magnet 1106 of the sender sequence switch by way of armature 1121 and its make contact; the next two pulses will pass to the said magnet by way of wiper 1105; thereby advancing the sender sequence switch to tenth position.

At the next energization of pulsing relay 1012 a circuit is closed from ground at make contact of armature 1013, break contact and armature 1014, through relay 1020, conductor 1142, bank contact 1143, wiper 1105, through operating magnet 1106 to negative battery. Both relay 1020 and magnet 1106 will fully energize over this circuit, the former closing an obvious circuit to operate magnet 1010 of the rounds sequence switch SEQ—2. At the end of this pulse operating magnet 1106 will deenergize and advance the sender sequence switch SEQ—3 one step, thereby returning it to normal position. Relay 1020, upon deenergizing, will open the circuit to operate magnet 1010, which, in turn, will deenergize, and advance the wipers of the rounds sequence switch SEQ—2 to second position. The operations just described have introduced the required space between the first and second rounds of the code transmitted over the alarm circuit AC. The transmitter is now in position to send the second round of the box number 2222.

In the next energization of pulsing relay 1012 a circuit is closed to operating magnet 1106 of the sender sequence switch by way of wiper 1016 and the second contact in the bank associated therewith, thus initiating the transmission of the second round. This operation need not be described in detail as it is identical with the sending of the first round.

When the pulsing relay 1012 next energizes, subsequent to wiper 1105 engaging back contact 1143, relay 1020 and operating magnet 1106 will again energize in series. Relay 1020 will again close the circuit of operating magnet 1010 and, upon the completion of the pulse, rounds sequence switch SEQ—2 will advance to third position. A restoring circuit may now be traced from ground at the break spring of the fourth key in the Rounds row, break springs of the third key, conductor 1201, cable 1004, bank contact 1022, wiper 1005, through self-interrupting springs and operating magnet 1010 to negative battery. The operating magnet will now operate and act as a buzzer to advance its wipers at high speed so long as wiper 1005 engages bank contacts connected to direct ground. When wiper 1005 reaches bank contact 1023 a circuit is closed from positive battery through high resistance slow-to-operate relay 1024, bank contact 1023, wiper 1005, through self-interrupting contacts and operating magnet 1010 to negative battery. The operating magnet cannot energize in this circuit because of the high resistance of relay 1024. Relay 1024, upon energizing, will place direct ground upon operating magnet 1010 by way of armature 1025 and its make contact, whereupon the operating magnet 1010 will become fully energized and open the circuit of relay 1024 at its self-interrupting contact. Relay 1024, upon deenergizing, will open the circuit of operating magnet 1010, which will now deenergize, advance the associated wiper one step, and reclose the circuit of relay 1024. Thus it will be seen that the rounds sequence switch SEQ—2 will operate to advance its wipers slowly so long as wiper 1005 engages bank contacts connected to relay 1024. When wiper 1005 reaches bank contact 1009 the rotation will cease and the transmitter will again be in normal position.

The slow advance of the rounds sequence switch SEQ—2 from position six to normal is required in order that the key release magnet KRM, Fig. 9, may have ample time to mechanically unlock the depressed rounds and digit keys. In this connection it will be noted that wiper 1026, upon engaging bank contact 1927, will complete the circuit of relay 1028, and that the latter relay, upon energizing, will close a circuit from ground at the make contact of armature 1029, conductor 997 through the release magnet KRM to negative battery. It is further to be noted that slow-to-release relay 1030 is in parallel with the operating magnet 1010 and functions to open the circuit to the sender sequence switch SEQ—3 at armature 1015. If for any reason the sender sequence switch SEQ—3 fails to advance to normal position the off-normal springs 1107 will not open, relay 1108 will not release, and the rounds sequence switch SEQ—2 cannot restore to normal because of the absence of ground on bank contact 1019.

Attention may be called at this time to the fact that the transmitter will not only function to send a four-digit box number, but will function equally well to send a three-, two-, or one-digit number. This is because the contacts in the sending levels of the sender switch SEN—2 are normally grounded and, in the event that the number 2222 has been set up, it follows that no code will be sent while wiper 1102 passes at high speed over its associated bank contacts.

The description so far has had to do with the setting up of a box number, the functioning of the rounds sequence switch to determine the number of repeats, the operation of the sender sequence switch to associate the sender with the sending keys in the proper order, and finally, the operation of the sender to transmit a code over the alarm circuit at a speed determined by the self-interrupting relay 1000.

It will now be shown that the transmitter is capable of sending at two speeds; first, a high speed which is that of relay 1000, and second, a low speed which is one-half that of relay 1000. It will further be shown that the first two rounds will be normally sent at high speed, and the succeeding rounds, if any, at low speed; and that all rounds may be sent either at high speed or at low speed, when so desired.

We will next assume that the fourth key in the Rounds row has been depressed, and that some four-digit number has been set up on the sending keys. When the Start key is next depressed the circuit of relay 1007 and operating magnet 1010 will be closed as heretofore explained, thus starting the cycle of transmission. At the first energization of relay 1012 a circuit is closed from ground at the make contact of armature 1032, break springs controlled by armature 1033, through the lower winding of differential relay 1034 to battery; a circuit parallel thereto is also closed through the lower winding of differential relay 1035 to battery; a further circuit parallel thereto is closed by way of armature 1036 and its break contact, through the upper winding of relay 1035 to battery. Relay 1035 will not operate at this time because of the differential effect of its two windings. Relay 1034 will energize and, by way of armature 1033, will lock itself and the lower winding of relay 1035 to holding ground at the make contact of armature 1011. Upon the deenergization of relay 1012 the circuit to the upper winding of relay 1035 will be opened, whereupon the lower winding will cause the relay to become fully operated. At the next energization of relay 1012 a circuit is closed from ground at the make contact of armature 1032, armature 1036 and its make contact, through the upper winding of relay 1034 to negative battery. The differential effect of its two windings will cause the restoration of relay 1034, it is to be noted, however, that the make-before-break contacts controlled by armature 1033 have functioned to replace holding ground at armature 1011 by the ground at the make contact of armature 1032, thus maintaining a circuit for the lower winding of relays 1034 and 1035. At the next deenergization of relay 1032 the circuits to the windings of relay 1034 and to the lower winding of relay 1035 will be opened, whereupon the latter relay will deenergize, and thus complete the cycle. From the foregoing it will be seen that relays 1034 and 1035 are in effect a frequency divider, and that armature 1037 of relay 1034 will produce pulses at one-half the speed of those produced by armature 1032.

The transmitter will function as before described to send the first two rounds at high speed, that of relay 1012. When the rounds sequence switch SEQ—2 advances to third position a circuit may be traced from ground at wiper 1026, bank contact 1038, conductor 909, cable 908, break springs of Fast key, conductor 1039, cable 908, through relay 1040 to negative battery. Relay 1040, upon energizing, will, by virtue of armature 1014, substitute pulses from armature 1037 for those previously received from armature 1013. The transmitter will therefore send the third and fourth rounds at slow speed, that of relay 1037.

If the operator desires that all rounds be sent at high speed he will depress the Fast key, thereby preventing the operation of relay 1040. Should he desire that all rounds be sent at slow speed he will depress the Slow key, thus causing the immediate operation of relay 1040. Should the operator desire to "kill" a code in the processes of transmission he need only depress the Stop key, thus opening the circuit to relay 1100.

While this invention has been shown as used in connection with a fire alarm system, it will be understood that it could be utilized equally as well in connection with any other signaling system, such as watchman's service, police signaling, and supervisory signaling.

Having described the invention, what is considered to be new and is desired to be protected by Letters Patent, will be set forth in the following claims:

What is claimed is:

1. In an alarm system, a plurality of alarm lines of one class each having a plurality of code transmitting series alarm boxes connected in series circuit thereon, a plurality of other alarm lines of another class each having a single radial alarm box of the circuit breaker type connected thereon, a district office in which said first- and second-named classes of lines terminate, means in said office individual to each of said alarm boxes operated responsive to an alarm from its associated box, and common equipment at said district office controlled responsive to the operation of any one of said individual means by an alarm box on any class of said lines for identifying the alarm sending box.

2. In an alarm system, a plurality of alarm lines of one class each having a plurality of code transmitting series alarm boxes connected in series circuit thereon, a plurality of other alarm lines of another class each having a single radial alarm box of the circuit breaker type connected thereon, a district office in which said first- and second-named classes of lines terminate, a relay group associated with each of said second-named lines and forming the terminus thereof operable from its associated box, a switch associated with each first-named lines and forming the terminus thereof, each operable from any box on its associated line and a relay group for each alarm box on each of said first-named lines and selectable responsive to the operation of one of said switches in response to a call from a box on its associated line, common transmitting equipment, and means in said relay groups for controlling said transmitting equipment to transmit a signal to identify the associated alarm box.

3. In an alarm system, an alarm headquarters, a district office, a first trunk and a second trunk connecting said district office with alarm headquarters, alarm boxes connected to said district office, means at any of said alarm boxes for transmitting a signal to its associated district office, a code sending switch including a high speed interrupter and a low speed interrupter at the associated district office operated responsive to the reception of the said signal for retransmitting once only at high speed a coded signal indicative of the transmitting box number to said alarm headquarters over said first trunk, and for then continuously retransmitting at slow speed the said coded signal to said alarm headquarters over the said second trunk, means in said alarm headquarters operated responsive to the reception of the coded signal over the first trunk to visually display the number of the transmitting box, and means in said alarm headquarters operated responsive to the reception of the coded signal over the second trunk to permanently record each repetition thereof.

4. In an alarm system, an alarm headquarters, a district office, a first trunk and a second trunk connecting said district office with alarm headquarters, alarm boxes connected to said district office, means at each of said alarm boxes for transmitting a signal to its associated district office, a two-speed code sending switch, a plurality of means at the associated district office each individual to one of said boxes, each of said last-mentioned means operated responsive to the reception of a signal from its associated box for controlling said code sending switch to retransmit once only at one speed a coded signal indicative of the transmitting box number to said alarm headquarters over said first trunk and to then repeatedly retransmit at another speed the said coded signal to said alarm headquarters over the said second trunk, means in said alarm headquarters operated responsive to the reception of the coded signal over the first trunk to visually display the number of the transmitting box, means in said alarm headquarters operated responsive to the reception of the coded signal over the second trunk to permanently record each repetition thereof, and means manually operative at said alarm headquarters to effect the release of the retransmitting equipment at the said district office to discontinue said repeated retransmission.

5. In an alarm system, an alarm box arranged when operated to transmit a plurality of series of impulses comprising short and long pulses, a line circuit over which said series of pulses are transmitted, means connected to said line circuit and responsive to said short and long pulses, means for converting all of the pulses received by said last-mentioned means into pulses of equal length, a two motion connector switch, including a first means controlled responsive to a first series of said converted impulses to complete one of said motions and a second means controlled responsive to a second series of said converted impulses to complete the other of said motions, and means associated with said switch for transferring the control of the converted impulses from said first means to said second means after said first series of converted impulses have been received.

6. In an alarm system, an alarm headquarters, a district office, alarm boxes connected to said district office, a first and second trunk connecting said district office with said alarm headquarters, a code sender switch at said district office including a high speed interrupter and a low speed interrupter, means at said office individual to each of said alarm boxes operated responsive to the reception of an alarm from its associated alarm box for controlling said sender to transmit a code indicative of the said alarm box, means for controlling said sender switch to transmit said code first at high speed over said first trunk and then at low speed over said second trunk, and means at said alarm headquarters operated over said first and second trunks for individually indicating each code received.

7. In an alarm system, a line circuit, an alarm box associated therewith, a two motion connector switch associated with said line circuit, means in said box operated responsive to an operation thereof to transmit series of impulses comprising two digit codes over said line circuit to operate said connector, means controlled by said connector switch when effectively operated by the digits of one of said codes for registering said code, and discriminating means in said connector for preventing the effective operation of said connector switch to register a code unless the digits of the code are received in the proper sequence.

HARRY E. HERSHEY.